United States Patent
Sahraei et al.

(10) Patent No.: US 11,677,603 B2
(45) Date of Patent: Jun. 13, 2023

(54) PEAK-TO-AVERAGE POWER RATIO REDUCTION WITH PSEUDO-RANDOM IN-BAND TONE RESERVATION

(71) Applicant: QUALCOMM Incorporated, San Diego, CA (US)

(72) Inventors: Saeid Sahraei, San Diego, CA (US); June Namgoong, San Diego, CA (US); Krishna Kiran Mukkavilli, San Diego, CA (US); Naga Bhushan, San Diego, CA (US); Tingfang Ji, San Diego, CA (US); Peter Gaal, San Diego, CA (US); Taesang Yoo, San Diego, CA (US); Gokul Sridaran, Sunnyvale, CA (US); Shimman Arvind Patel, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 101 days.

(21) Appl. No.: 17/241,393

(22) Filed: Apr. 27, 2021

(65) Prior Publication Data
US 2021/0344543 A1 Nov. 4, 2021

Related U.S. Application Data

(60) Provisional application No. 63/018,391, filed on Apr. 30, 2020.

(51) Int. Cl.
*H04L 27/26* (2006.01)
*H04W 72/0453* (2023.01)

(52) U.S. Cl.
CPC ..... *H04L 27/2614* (2013.01); *H04W 72/0453* (2013.01)

(58) Field of Classification Search
CPC ............ H04L 27/2614; H04L 27/2618; H04L 5/0044; H04W 72/0453
See application file for complete search history.

(56) References Cited

U.S. PATENT DOCUMENTS 6,636,566 B1 * 10/2003 Roberts ............... H04B 1/7176
375/247
6,671,310 B1 * 12/2003 Richards ............. H04B 1/7176
375/138

(Continued)

OTHER PUBLICATIONS

Ericsson: "NR Synchronization Signal Design", 3GPP TSG-RAN WG1 Meeting #87, 3GPP Draft, R1-1611897_NR_Synchronization_ Signal_Design, 3rd Generation Partnership Project (3GPP), Mobile Competence Centre, 650, Route Des Lucioles, F-06921 Sophia-Antipolis Cedex, France, vol. RAN WG1, No. Reno, NV, USA, Nov. 14, 2016-Nov. 18, 2016, Nov. 5, 2016 (Nov. 5, 2016), pp. 1-4, XP051190234, Retrieved from the Internet: URL: http://www.3gpp.org/ftp/tsg_ran/WG1_RL1/TSGR1_87/Docs/ [retrieved on Nov. 5, 2016] section 2.2.

(Continued)

*Primary Examiner* — Jay P Patel
(74) *Attorney, Agent, or Firm* — Holland & Hart LLP

(57) ABSTRACT

Wireless communications systems may configure a subset of allocated resources (e.g., one or more resource elements (REs) of one or more allocated resource blocks (RBs)) as peak reduction tones (PRTs) for a peak-cancelation signal. For instance, wireless communications systems may configure a fixed PRT allocation based on a Costas array. In some examples, each column of a Costas array may correspond to a RB of a set of allocated resources. A transmitting device may thus identify one or more PRT REs based on the Costas array and a mapping of allocated RBs to the columns of the Costas array. For instance, a transmitting device may identify a pattern of PRT REs to use for a peak-cancellation (Continued)

signal based at least in part on a configured Costas array (e.g., where the peak-cancellation signal may reduce peaks of a corresponding data signal to ultimately reduce peak-to-average power ratio (PAPR) of a transmission).

30 Claims, 19 Drawing Sheets

(56) References Cited

U.S. PATENT DOCUMENTS

| | | | | |
|---|---|---|---|---|
| 6,959,032 | B1* | 10/2005 | Richards | H04B 1/7176 |
| | | | | 375/138 |
| 7,954,035 | B2* | 5/2011 | Chae | H03M 13/116 |
| | | | | 714/793 |
| 11,140,011 | B2* | 10/2021 | Nguyen | H04L 27/2602 |
| 2008/0075153 | A1* | 3/2008 | Roberts | H04L 25/4902 |
| | | | | 375/220 |
| 2008/0141098 | A1* | 6/2008 | Chae | H03M 13/116 |
| | | | | 714/801 |
| 2009/0141823 | A1* | 6/2009 | Long | H04L 27/2618 |
| | | | | 375/260 |
| 2010/0080113 | A1 | 4/2010 | Yang et al. | |
| 2012/0044796 | A1* | 2/2012 | Yoon | G01S 1/042 |
| | | | | 370/336 |
| 2020/0267040 | A1* | 8/2020 | Nguyen | H04L 27/2602 |
| 2022/0014410 | A1* | 1/2022 | Nguyen | H04L 27/2618 |
| 2022/0159678 | A1* | 5/2022 | Back | H04L 5/0007 |

OTHER PUBLICATIONS

Hu S., et al., "Nonlinearity Reduction by Tone Reservation with Null Subcarriers for WiMAX System", Wireless Personal Communications, Kluwer Academic Publishers, DO, vol. 54, No. 2, Apr. 28, 2009 (Apr. 28, 2009), pp. 289-305, XP019832925, ISSN: 1572-834X, section 4.2.

International Search Report and Written Opinion—PCT/US2021/029543—ISA/EPO—dated Aug. 5, 2021 (203818WO).

Nokes C., "T2_0237 Minutes of 6th T2 Meeting, Helsinki, Jun. 2007", DVB, Digital Video Broadcasting, C/O EBU 17A Ancienne Route—CH-1218 Grand Saconnex, Geneva—Switzerland, Sep. 14, 2007 (Sep. 14, 2007), pp. 1-21, XP017817467, Retrieved from the Internet: URL: https://www.dvb.org/resources/restricted/members/documents/TM-T2/T2_0237_Minutes_6th_Meeting_TM-T2_jun07_v1.0.doc [retrieved on Sep. 14, 2007] section 4.4, 3. Paragraph.

Wang M., et al., "OFDMA Uplink PAR Reduction via Tone Reservation", Global Telecommunications Conference, 2007, GLOBECOM '07. IEEE, IEEE, Piscataway, NJ, USA, Nov. 1, 2007 (Nov. 1, 2007), pp. 3802-3806, XP031196650, DOI: 10.1109/GLOCOM.2007.585, ISBN: 978-1-4244-1042-2, section IV.

* cited by examiner

PEAK-TO-AVERAGE POWER RATIO REDUCTION WITH PSEUDO-RANDOM IN-BAND TONE RESERVATION

CROSS REFERENCE

The present Application for Patent claims the benefit of U.S. Provisional Patent Application No. 63/018,391 by SAHRAEI et al., entitled "PEAK-TO-AVERAGE POWER RATIO REDUCTION WITH PSEUDO-RANDOM IN-BAND TONE RESERVATION," filed Apr. 30, 2020, assigned to the assignee hereof, and expressly incorporated by reference herein.

FIELD OF TECHNOLOGY

The following relates generally to wireless communications and more specifically to peak-to-average power ratio (PAPR) reduction with pseudo-random in-band tone reservation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some cases, a transmitting device may include a power amplifier (PA) to amplify signals before transmission. Further, a signal transmitted by a transmitting device may have an associated peak to average power ratio (PAPR) and, as PAPR increases, the efficiency of a PA amplifying the signal (e.g., a ratio of an output power to an input power for the PA) may decrease. Transmitting devices whose PAs have a decreased efficiency may consume more power or have other performance drawbacks.

SUMMARY

The described techniques relate to improved methods, systems, devices, and apparatuses that support peak-to-average power ratio (PAPR) reduction (e.g., for orthogonal frequency division multiplexing (OFDM)) with pseudo-random in-band tone reservation. Generally, the described techniques provide for a transmitting device to reduce PAPR while increasing an amount of data that may be conveyed to a receiving device. Some aspects of the described techniques may provide for a transmitting device performing, via a set of allocated resources, an OFDM transmission including a data signal and a peak-cancelation signal for efficient PAPR reduction. For instance, a transmitting device (e.g., a user equipment (UE)) may identify data to include in a data signal of an OFDM transmission. The transmitting device may then process a peak-cancelation signal based on the identified data signal (e.g., where the peak-cancelation signal may reduce PAPR of the OFDM transmission via reducing the peaks of the corresponding data signal).

In accordance with one or more aspects of the described techniques, wireless communications systems may configure a subset of allocated resources (e.g., one or more resource elements (REs) of one or more allocated resource blocks (RBs)) as peak reduction tones (PRTs) for a peak-cancelation signal. For instance, wireless communications systems may configure a fixed PRT allocation based on a Costas array. In some examples, each column of a Costas array may correspond to a RB of a set of allocated resources. A transmitting device may thus identify one or more PRT REs based on the Costas array and a mapping of allocated RBs to the columns of the Costas array. In other words, a transmitting device may identify a pattern of PRT REs to use for a peak-cancellation signal based at least in part on a configured Costas array (e.g., where the peak-cancellation signal may reduce peaks of a corresponding data signal to ultimately reduce PAPR of an OFDM transmission including the data signal and the peak-cancellation signal).

A method of wireless communication at a UE is described. The method may include receiving a control signal indicating that the UE is to utilize one or more PRTs for an uplink transmission period, identifying, from a set of allocated resources, first subcarriers for transmitting a data signal, identifying the one or more PRTs for transmitting a peak-cancellation signal based on a Costas array, and transmitting, during the uplink transmission period, the data signal on the first subcarriers of the set of allocated resources with the peak-cancellation signal on the one or more PRTs of the set of allocated resources.

An apparatus for wireless communication at a UE is described. The apparatus may include a processor, memory coupled with the processor, and instructions stored in the memory. The instructions may be executable by the processor to cause the apparatus to receive a control signal indicating that the UE is to utilize one or more PRTs for an uplink transmission period, identify, from a set of allocated resources, first subcarriers for transmitting a data signal, identify the one or more PRTs for transmitting a peak-cancellation signal based on a Costas array, and transmit, during the uplink transmission period, the data signal on the first subcarriers of the set of allocated resources with the peak-cancellation signal on the one or more PRTs of the set of allocated resources.

Another apparatus for wireless communication at a UE is described. The apparatus may include means for receiving a control signal indicating that the UE is to utilize one or more PRTs for an uplink transmission period, identifying, from a set of allocated resources, first subcarriers for transmitting a data signal, identifying the one or more PRTs for transmitting a peak-cancellation signal based on a Costas array, and transmitting, during the uplink transmission period, the data signal on the first subcarriers of the set of allocated resources with the peak-cancellation signal on the one or more PRTs of the set of allocated resources.

A non-transitory computer-readable medium storing code for wireless communication at a UE is described. The code may include instructions executable by a processor to receive a control signal indicating that the UE is to utilize one or more PRTs for an uplink transmission period, identify, from a set of allocated resources, first subcarriers for transmitting a data signal, identify the one or more PRTs for transmitting a peak-cancellation signal based on a Costas array, and transmit, during the uplink transmission period, the data signal on the first subcarriers of the set of allocated resources with the peak-cancellation signal on the one or more PRTs of the set of allocated resources.

In some examples of the method, apparatuses, and non-transitory computer-readable medium described herein, identifying the one or more PRTs for the peak-cancellation signal based on the Costas array may include operations, features, means, or instructions for identifying a first mapping between each RB of the set of allocated resources and a respective column of the Costas array, and identifying a RE from each RB based on a row of the respective column of the Costas array, where the one or more PRTs for the peak-cancellation signal may be identified based on the identified RE from each RB.

Some examples of the method, apparatuses, and non-transitory computer-readable medium described herein may further include operations, features, means, or instructions for receiving a first indication of a first starting column of the Costas array, where the first mapping may be identified based on the first starting column of the Costas array. Some examples of the method, apparatuses, and non-transitory computer-readable medium described herein may further include operations, features, means, or instructions for receiving a second indication of a second starting column of the Costas array, and identifying a second mapping between a subset of RBs of the set of allocated resources and the respective column of the Costas array, where the second mapping may be identified based on the second starting column of the Costas array.

Some examples of the method, apparatuses, and non-transitory computer-readable medium described herein may further include operations, features, means, or instructions for identifying a set of subsets of RBs of the set of allocated resources, where each subset of the set includes a quantity of RBs equivalent to a number of columns of the Costas array, and identifying a different starting column of the Costas array for each of the subsets, where the first mapping between each RB of the set of allocated resources and the respective column of the Costas array may be based on the different starting column of the Costas array.

Some examples of the method, apparatuses, and non-transitory computer-readable medium described herein may further include operations, features, means, or instructions for identifying a decimation factor for the first mapping between each RB of the set of allocated resources and a respective column of the Costas array, where the first mapping may be identified based on the decimation factor. Some examples of the method, apparatuses, and non-transitory computer-readable medium described herein may further include operations, features, means, or instructions for receiving an indication of the decimation factor, where the decimation factor may be identified based on the indication. In some examples of the method, apparatuses, and non-transitory computer-readable medium described herein, the decimation factor indicates a pattern of a first set of RBs used entirely for data and a second set of RBs each respectively including at least one RE for PRTs.

Some examples of the method, apparatuses, and non-transitory computer-readable medium described herein may further include operations, features, means, or instructions for receiving an indication to use one or more RBs adjacent to the set of allocated resources for PRTs, where the one or more PRTs may be identified based on the one or more RBs adjacent to the set of allocated resources. Some examples of the method, apparatuses, and non-transitory computer-readable medium described herein may further include operations, features, means, or instructions for identifying a transmission power level based on the received second indication to use one or more RBs adjacent to the set of allocated resources for PRTs. Some examples of the method, apparatuses, and non-transitory computer-readable medium described herein may further include operations, features, means, or instructions for identifying a first quantity of RBs associated with the set of allocated resources, and identifying a second quantity of the one or more RBs adjacent to the set of allocated resources for PRTs based on the first quantity and the received second indication.

In some examples of the method, apparatuses, and non-transitory computer-readable medium described herein, identifying the one or more PRTs for the peak-cancellation signal based on the Costas array may include operations, features, means, or instructions for identifying one RE in every RB of the set of allocated resources, where the one RE may be allocated as a PRT. In some examples of the method, apparatuses, and non-transitory computer-readable medium described herein, the Costas array may be based on a primitive element equal to two and a prime number equal to thirteen. In some examples of the method, apparatuses, and non-transitory computer-readable medium described herein, the Costas array includes a twelve by twelve Costas array.

In some examples of the method, apparatuses, and non-transitory computer-readable medium described herein, the Costas array includes a first column indicating a first PRT in a second RE of a first RB corresponding to the first column, a second column indicating a second PRT in a fourth RE of a second RB corresponding to the second column, a third column indicating a third PRT in a eighth RE of a third RB corresponding to the third column, a fourth column indicating a fourth PRT in a third RE of a fourth RB corresponding to the fourth column, a fifth column indicating a fifth PRT in a sixth RE of a fifth RB corresponding to the fifth column, a sixth column indicating a sixth PRT in a twelfth RE of a sixth RB corresponding to the sixth column, a seventh column indicating a seventh PRT in a eleventh RE of a seventh RB corresponding to the seventh column, an eighth column indicating an eighth PRT in a ninth RE of an eighth RB corresponding to the eighth column, a ninth column indicating a ninth PRT in a fifth RE of a ninth RB corresponding to the ninth column, a tenth column indicating a tenth PRT in a tenth RE of a tenth RB corresponding to the tenth column, an eleventh column indicating an eleventh PRT in a seventh RE of an eleventh RB corresponding to the eleventh column, and a twelfth column indicating a twelfth PRT in a first RE of a twelfth RB corresponding to the twelfth column.

In some examples of the method, apparatuses, and non-transitory computer-readable medium described herein, each column of the Costas array indicates, for a respective RB of the set of allocated resources, a RE for a PRT and each column of the Costas array indicates a different position for the RE within the respective RB.

Some examples of the method, apparatuses, and non-transitory computer-readable medium described herein may further include operations, features, means, or instructions for identifying the Costas array based on identifying a number of RBs associated with the set of allocated resources exceeds a threshold, where the Costas array includes a thirty six by thirty six Costas array. In some examples of the method, apparatuses, and non-transitory computer-readable medium described herein, the Costas array may be based on a primitive element equal to two and a prime number equal to thirty-seven.

Some examples of the method, apparatuses, and non-transitory computer-readable medium described herein may further include operations, features, means, or instructions for processing the peak-cancellation signal for transmission on the one or more PRTs based on a waveform of the data signal. In some examples of the method, apparatuses, and non-transitory computer-readable medium described herein, the peak-cancellation signal reduces a PAPR associated with the data signal based on the processing. In some examples of the method, apparatuses, and non-transitory computer-readable medium described herein, the peak-cancellation signal satisfies a power budget threshold associated with the uplink transmission period based on the processing.

In some examples of the method, apparatuses, and non-transitory computer-readable medium described herein, transmitting the data signal with the peak-cancellation signal may include operations, features, means, or instructions for identifying a time-domain OFDM waveform based on an inverse discrete Fourier transform of the one or more PRTs and one or more data tones associated with the first subcarriers, where the identified time-domain OFDM waveform includes the data signal with the peak-cancellation signal.

A method of wireless communication at a base station is described. The method may include transmitting a control signal indicating that a UE is to utilize one or more PRTs for an uplink transmission period, identifying, from a set of allocated resources, first subcarriers for receiving a data signal, identifying the one or more PRTs for UE transmission of a peak-cancellation signal based on a Costas array, and receiving, during the uplink transmission period, the data signal on the first subcarriers of the set of allocated resources with the peak-cancellation signal on the one or more PRTs of the set of allocated resources.

An apparatus for wireless communication at a base station is described. The apparatus may include a processor, memory coupled with the processor, and instructions stored in the memory. The instructions may be executable by the processor to cause the apparatus to transmit a control signal indicating that a UE is to utilize one or more PRTs for an uplink transmission period, identify, from a set of allocated resources, first subcarriers for receiving a data signal, identify the one or more PRTs for UE transmission of a peak-cancellation signal based on a Costas array, and receive, during the uplink transmission period, the data signal on the first subcarriers of the set of allocated resources with the peak-cancellation signal on the one or more PRTs of the set of allocated resources.

Another apparatus for wireless communication at a base station is described. The apparatus may include means for transmitting a control signal indicating that a UE is to utilize one or more PRTs for an uplink transmission period, identifying, from a set of allocated resources, first subcarriers for receiving a data signal, identifying the one or more PRTs for UE transmission of a peak-cancellation signal based on a Costas array, and receiving, during the uplink transmission period, the data signal on the first subcarriers of the set of allocated resources with the peak-cancellation signal on the one or more PRTs of the set of allocated resources.

A non-transitory computer-readable medium storing code for wireless communication at a base station is described. The code may include instructions executable by a processor to transmit a control signal indicating that a UE is to utilize one or more PRTs for an uplink transmission period, identify, from a set of allocated resources, first subcarriers for receiving a data signal, identify the one or more PRTs for UE transmission of a peak-cancellation signal based on a Costas array, and receive, during the uplink transmission period, the data signal on the first subcarriers of the set of allocated resources with the peak-cancellation signal on the one or more PRTs of the set of allocated resources.

In some examples of the method, apparatuses, and non-transitory computer-readable medium described herein, identifying the one or more PRTs for the peak-cancellation signal based on the Costas array may include operations, features, means, or instructions for identifying a first mapping between each RB of the set of allocated resources and a respective column of the Costas array, and identifying a RE from each RB based on a row of the respective column of the Costas array, where the one or more PRTs for the peak-cancellation signal may be identified based on the identified RE from each RB.

Some examples of the method, apparatuses, and non-transitory computer-readable medium described herein may further include operations, features, means, or instructions for transmitting a first indication of a first starting column of the Costas array, where the first mapping may be based on the first starting column of the Costas array. Some examples of the method, apparatuses, and non-transitory computer-readable medium described herein may further include operations, features, means, or instructions for identifying a second mapping between a subset of RBs of the set of allocated resources and the respective column of the Costas array, and transmitting a second indication of a second starting column of the Costas array, where the second mapping may be based on the second starting column of the Costas array.

Some examples of the method, apparatuses, and non-transitory computer-readable medium described herein may further include operations, features, means, or instructions for identifying a set of subsets of RBs of the set of allocated resources, where each subset of the set includes a quantity of RBs equivalent to a number of columns of the Costas array, and identifying a different starting column of the Costas array for each of the subsets, where the first mapping between each RB of the set of allocated resources and the respective column of the Costas array may be based on the different starting column of the Costas array.

Some examples of the method, apparatuses, and non-transitory computer-readable medium described herein may further include operations, features, means, or instructions for identifying a decimation factor for the first mapping between each RB of the set of allocated resources and a respective column of the Costas array, where the first mapping may be identified based on the decimation factor. Some examples of the method, apparatuses, and non-transitory computer-readable medium described herein may further include operations, features, means, or instructions for transmitting an indication of the decimation factor, where the decimation factor may be based on the indication. In some examples of the method, apparatuses, and non-transitory computer-readable medium described herein, the decimation factor indicates a pattern of a first set of RBs used entirely for data and a second set of RBs each respectively including at least one RE for PRTs.

Some examples of the method, apparatuses, and non-transitory computer-readable medium described herein may further include operations, features, means, or instructions for transmitting an indication to use one or more RBs adjacent to the set of allocated resources for PRTs, where the one or more PRTs may be identified based on the one or more RBs adjacent to the set of allocated resources. Some examples of the method, apparatuses, and non-transitory computer-readable medium described herein may further include operations, features, means, or instructions for identifying a transmission power level based on the received second indication to use one or more RBs adjacent to the set of allocated resources for PRTs, where the data signal and peak cancellation signal may be received based on the identified transmission power level. Some examples of the method, apparatuses, and non-transitory computer-readable medium described herein may further include operations, features, means, or instructions for identifying a first quantity of RBs associated with the set of allocated resources, and identifying a second quantity of the one or more RBs adjacent to the set of allocated resources for PRTs based on the first quantity and the received second indication.

In some examples of the method, apparatuses, and non-transitory computer-readable medium described herein, identifying the one or more PRTs for the peak-cancellation signal based on the Costas array may include operations, features, means, or instructions for identifying one RE in every RB of the set of allocated resources, where the one RE may be allocated as a PRT. In some examples of the method, apparatuses, and non-transitory computer-readable medium described herein, the Costas array may be based on a primitive element equal to two and a prime number equal to thirteen. In some examples of the method, apparatuses, and non-transitory computer-readable medium described herein, the Costas array includes a twelve by twelve Costas array.

In some examples of the method, apparatuses, and non-transitory computer-readable medium described herein, the Costas array includes a first column indicating a first PRT in a second RE of a first RB corresponding to the first column, a second column indicating a second PRT in a fourth RE of a second RB corresponding to the second column, a third column indicating a third PRT in a eighth RE of a third RB corresponding to the third column, a fourth column indicating a fourth PRT in a third RE of a fourth RB corresponding to the fourth column, a fifth column indicating a fifth PRT in a sixth RE of a fifth RB corresponding to the fifth column, a sixth column indicating a sixth PRT in a twelfth RE of a sixth RB corresponding to the sixth column, a seventh column indicating a seventh PRT in a eleventh RE of a seventh RB corresponding to the seventh column, an eighth column indicating an eighth PRT in a ninth RE of an eighth RB corresponding to the eighth column, a ninth column indicating a ninth PRT in a fifth RE of a ninth RB corresponding to the ninth column, a tenth column indicating a tenth PRT in a tenth RE of a tenth RB corresponding to the tenth column, an eleventh column indicating an eleventh PRT in a seventh RE of an eleventh RB corresponding to the eleventh column, and a twelfth column indicating a twelfth PRT in a first RE of a twelfth RB corresponding to the twelfth column.

In some examples of the method, apparatuses, and non-transitory computer-readable medium described herein, each column of the Costas array indicates, for a respective RB of the set of allocated resources, a RE for a PRT and each column of the Costas array indicates a different position for the RE within the respective RB. Some examples of the method, apparatuses, and non-transitory computer-readable medium described herein may further include operations, features, means, or instructions for identifying the Costas array based on identifying a number of RBs associated with the set of allocated resources exceeds a threshold, where the Costas array includes a thirty six by thirty six Costas array. In some examples of the method, apparatuses, and non-transitory computer-readable medium described herein, the Costas array may be based on a primitive element equal to two and a prime number equal to thirty-seven.

Some examples of the method, apparatuses, and non-transitory computer-readable medium described herein may further include operations, features, means, or instructions for identifying a waveform of the data signal based on processing the peak-cancellation signal on the one or more PRTs. In some examples of the method, apparatuses, and non-transitory computer-readable medium described herein, the peak-cancellation signal reduces a PAPR associated with the identified waveform. In some examples of the method, apparatuses, and non-transitory computer-readable medium described herein, the identified waveform satisfies a power budget threshold associated with the uplink transmission period. Some examples of the method, apparatuses, and non-transitory computer-readable medium described herein may further include operations, features, means, or instructions for identifying a time-domain OFDM waveform based on the receiving, and identifying the one or more PRTs and one or more data tones associated with the first subcarriers based on a fast Fourier transform of the time-domain OFDM waveform.

DETAILED DESCRIPTION

Figure 1:
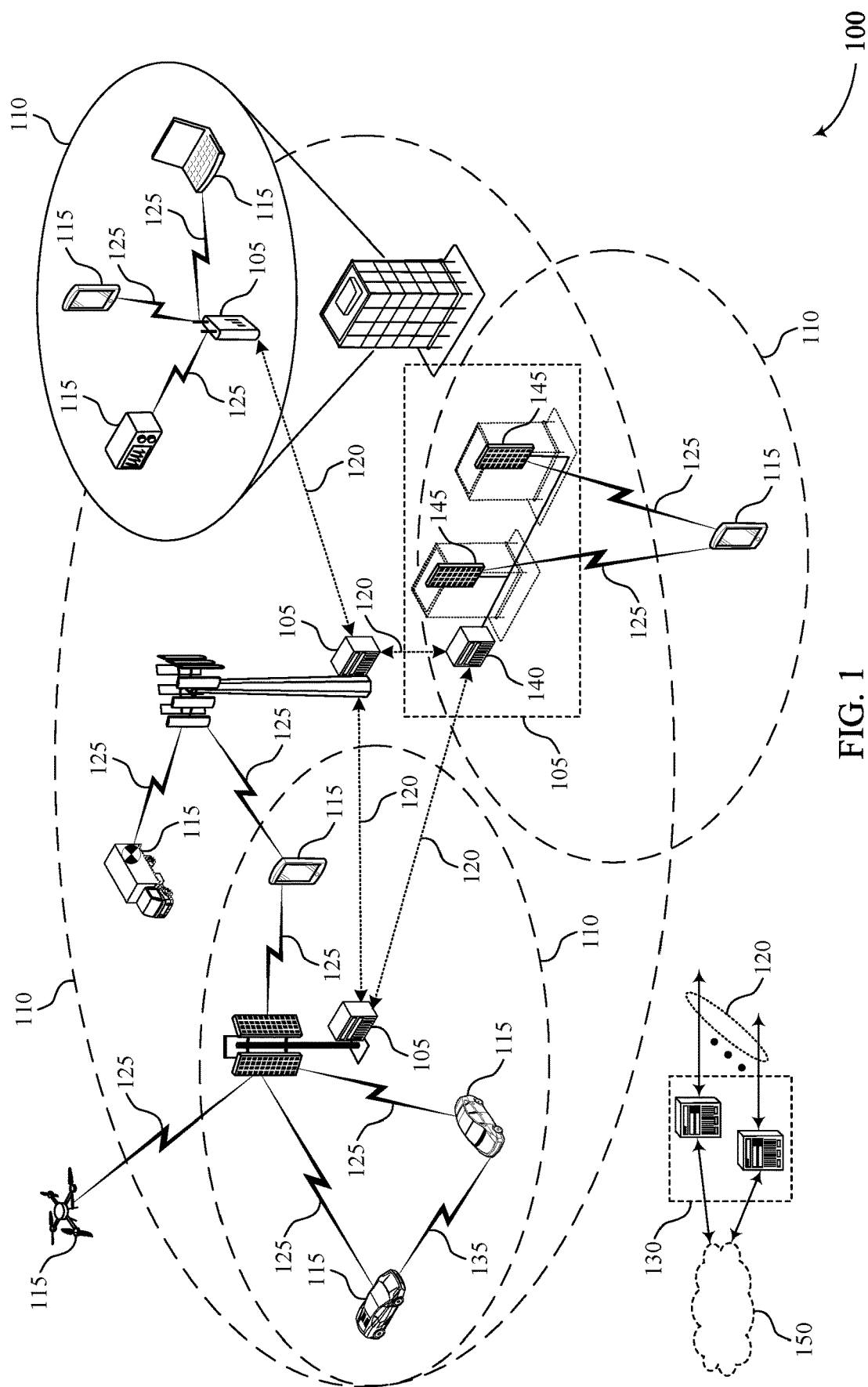
FIG. 1 illustrates an example wireless communications system that supports peak-to-average power ratio (PAPR) reduction with pseudo-random in-band tone reservation in accordance with aspects of the present disclosure.

Some wireless communications systems (e.g., 5G New Radio (NR) systems) may support high-order constellations (such as 256 quadrature amplitude modulation (QAM), 1024 QAM, 4K QAM, or 16K QAM, among other examples) which may require low error vector magnitude (EVM) to ensure accurate data recovery at a receiving device. EVM may refer to a measure of the distance between the points on a constellation and their ideal locations. As each constellation point may represent a different phase and amplitude combination, higher-order constellations may require a power amplifier (PA) of a transmitter to have an operating range large enough to represent the range of amplitudes in a data signal to be transmitted (e.g., in order to ensure low EVM). However, orthogonal frequency division multiplexing (OFDM) signaling techniques may tend to yield high peak-to-average power ratios (PAPRs) compared to single-carrier signaling techniques, which may reduce the efficiency of the PA at the transmitter. For instance, if a signal is associated with relatively high PAPR, an input back-off (IBO) of the PA may be increased to avoid significant signal distortion (e.g., and increasing the PA back-off may result in lower PA efficiency and less output power). Therefore, it may be desirable to reduce PAPR (e.g., reduce the ratio of a peak power of the transmitted signal to an average power of the transmitted signal) for wireless communications from a transmitting device to a receiving device.

According to the techniques described herein, wireless communications systems may configure a subset of allocated resources (e.g., one or more resource elements (REs) of one or more allocated resource blocks (RBs)) as peak reduction tones (PRTs) for a peak-cancelation signal. For instance, wireless communications systems may configure a fixed PRT allocation based on a Costas array. In some examples, each column of a Costas array may correspond to a RB of a set of allocated resources. A transmitting device may thus identify one or more PRT REs based on the Costas array and a mapping of allocated RBs to the columns of the Costas array. In other words, a transmitting device may identify a pattern of PRT REs to use for a peak-cancellation signal based at least in part on a configured Costas array (e.g., where the peak-cancellation signal may reduce peaks of a corresponding data signal to ultimately reduce PAPR of an OFDM transmission including the data signal and the peak-cancellation signal).

As such, a communicating devices within a wireless communications system may effectively reduce PAPR of transmitted signals, while maintaining efficient data throughput (e.g., without unnecessary PRT overhead), without necessarily employing signal clipping techniques (e.g., as signal clipping techniques may result in in-band distortion or may otherwise distort the signal received by a receiving device). As described herein, such improvement (e.g., reduction) of PAPR may thus result in efficient operation of a PA via reduced IBO, increased output power of the PA, improved coverage by the transmitting device, etc.

Transmitting devices (e.g., user equipment (UEs), a base station, etc.) may identify PRTs for a peak-cancellation signal based on a configured Costas array (e.g., to reduce PAPR of an OFDM transmission including a data signal and the corresponding peak-cancellation signal). For instance, a transmitting device may identify a mapping between a set of allocated resources and the configured Costas array. In some examples, one or more RBs of the allocated set of resources may be mapped to columns of the Costas array, such that a row or element of a particular column of the Costas array may indicate a PRT RE of the RB corresponding to the particular column of the Costas array.

In some cases, a base station may transmit control signaling to a UE to further configure the mapping between a configured Costas array and a set of uplink resources allocated for the UE. For instance, the mapping between a Costas array and a set of allocated resources may configured based on one or more starting column indications (e.g., based on one or more indications of starting columns of the Costas array to be used for mapping the set of allocated resources to the Costas array). In some cases, the mapping between a Costas array and a set of allocated resources may configured based on an indication of a decimation factor (e.g., a spacing of RBs, within the set of allocated resources, that include PRT REs). Moreover, in some examples, a base station may transmit an indication of whether PRT(s) of one or more RBs adjacent to the set of allocated resources may be used (e.g., where PRT(s) of the adjacent RBs may also be mapped to the Costas array in accordance with indicated starting columns, decimation factors, etc.). In some examples, as described herein, one or more Costas arrays may be specified or preconfigured by a wireless communications system, and a mapping between allocated uplink resources and the one or more Costas arrays may be further configured by a base station via control signaling.

Aspects of the disclosure are initially described in the context of example wireless communications systems. Example PRT configurations and an example process flow illustrating one or more aspects of the discussed techniques are then described. Aspects of the disclosure are further illustrated by and described with reference to apparatus diagrams, system diagrams, and flowcharts that relate to PAPR reduction with pseudo-random in-band tone reservation.

FIG. 1 illustrates an example of a wireless communications system 100 that supports PAPR reduction with pseudo-random in-band tone reservation in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, an RE may consist of one symbol period (e.g., a duration of one modulation symbol) and one subcarrier, where the symbol period and subcarrier spacing are inversely related. The number of bits carried by each RE may depend on the modulation scheme (e.g., the order of the modulation scheme, the coding rate of the modulation scheme, or both). Thus, the more REs that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time-domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time-domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi (i.e., Institute of Electrical and Electronics Engineers (IEEE) 802.11) network may include an access point (AP) that may communicate with one or more wireless or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a device may communicate with an associated AP via downlink (e.g., the communication link from the AP to the device) and uplink (e.g., the communication link from the device to the AP). A wireless personal area network (PAN), which may include a Bluetooth connection, may provide for short range wireless connections between two or more paired wireless devices. For example, wireless devices such as cellular phones may utilize wireless PAN communications to exchange information such as audio signals with wireless headsets.

In some cases, a transmitting device (e.g., a UE 115 or base station 105) may have a PA. PAs may suffer from non-linearities as they approach their saturation point. Amplifying signals near saturation point may achieve maximum power efficiency, but may also saturate or clip the transmitted signal. Such saturating or clipping may distort the transmitted signal, which may thus generate output non-linearities such as spectral growth. Spectral growth may refer to the PA introducing frequencies into the signal that were not present before or were present in smaller proportions. Additionally, distorting the signal may have an impact on transmitted EVM such that the impact exceeds a constraint. As the PAPR of a signal increases, the a larger IBO may be taken such that the impact on the EVM does not exceed the constraint for constellations of a threshold size.

Wireless communications system 100 may support OFDM transmissions and OFDMA. Performing OFDMA may have several advantages. For instance, OFDMA may simplify channel estimation at a receiver (e.g., at a base station 105 receiving a data signal from a UE 115). Further, OFDMA may enable additional flexibility in utilizing available time and frequency resources (e.g., as compared to single carrier techniques), among other benefits. However, performing OFDMA may also increase data signal PAPR (e.g., as compared to single carrier techniques). As the PAPR increases, the power gain $\mu=P_{out}/P_{in}$ of a PA may exhibit increasingly non-linear behavior at a lower $P_{in}$ ($P_{out}$ may increase less for a proportional increase in $P_{in}$). For example, for a lower PAPR, the power efficiency may be approximately linear from $P_{in}=0$ to $P_{in}=P_x$ (where $P_x$ may be referred to as a working point for the lower PAPR). Similarly, for a higher PAPR, the power efficiency may be approximately linear from $P_{in}=0$ to $P_{in}=P_y$ (where $P_y$ may be referred to as a working point for the higher PAPR), where $P_x>P_y$. To maximize the power output, a PA may be operated with the working point near the non-linear part of the power efficiency curve.

That is, as $P_{out}$ is a function of $P_{in}$, an optimal PA working point may be as close as possible to the nonlinear part of the curve. Hence, in cases of high PAPR a large IBO may be implemented in order to have efficient EVM desirable for higher-order constellations (e.g., in order to meet EVM conditions or EVM requirements for communicating device). In other words, if PAPR is high, a PA may implement a large BO (e.g., from a power saturation level ($P_{sat}$) to the average power of the signal) from the point where the curve becomes non-linear. Reducing PAPR may require less BO and enable a working point with a higher power efficiency (e.g., an average signal power or working point closer to the nonlinear part of the $\mu=P_{out}/P_{in}$ curve). Thus, with lower PAPR, the transmitter may transmit at a higher power without compromising EVM. A PA may thus be more efficient under low PAPR as the working point may be closer to the power saturation level ($P_{sat}$) without compromising less efficient power consumption via additional $P_{in}$ (e.g., without the working point passing the non-linear point of the curve). By reducing the PAPR, for the same $P_{in}$, lower EVM and lower in-band emission and out-of-band emission may be achieved.

In other words, the performance of a PA may be generally divided into a linear region and a saturation region. Operating closer to the saturation region may increase the output power which may be advantageous in terms of coverage enhancement. Alternatively, operating too close to the saturation point may result in distortion of the signal, as well as in-band and out-of-band emission, which may be undesirable (e.g., due to decoding complexity or reduced decoding performance at a receiving device). These issues may be exacerbated by the high PAPR of an OFDM waveform. The techniques described herein may reduce PAPR such that a PA may operate closer to the saturation point while experiencing less distortion, while meeting EVM conditions, adjacent channel leakage ratio (ACLR), conditions, in-band emission (IBE) conditions, spectrum emission mask (SEM) conditions, etc. Further, operating a PA closer to the saturation point may enable a transmitting device to transmit at a higher power which may increase the range of coverage.

As the size of, or a number of points in, a signal constellation increases (e.g., 256 QAM to 1024 QAM to 4KQAM to 16KQAM and so on), a transmitter (e.g., a UE 115) may use more power to achieve sufficiently low EVM, which may result in higher power consumption, reduced battery life, increased energy cost, among other examples. For example, for higher-order constellations (e.g., 16KQAM) it may be desirable to realize low bit error rates (BERs) to recover information from a data signal (e.g., as higher-order constellation points may be represented by more granular differences in phase and amplitude combinations). However, if the transmitter is transmitting a data signal with a higher PAPR at a high $P_{in}$ (e.g., to reduce EVM), the power efficiency μ of the PA amplifying the signal may be lower than that for transmitting a data signal with a lower PAPR at the same $P_{in}$. As such, methods which reduce the PAPR may enable more efficient power consumption (e.g., enable a working point with higher power efficiency) while achieving sufficiently low EVM for maintaining constellations of increasing size (e.g., increasing order).

In some cases, communicating devices in a wireless communications system (e.g., UEs 115, base stations 105, etc.) may reduce PAPR by clipping or chopping off peaks from a data signal (e.g., where each peak of a data signal that is above a clipping threshold may be clipped or chopped off). For example, during data signal processing for uplink communications, a UE 115 may perform an inverse discrete Fourier transform (IDFT) and clip or remove peaks of the data signal (e.g., represented across the time-domain after the IDFT) based on some clipping level or peak amplitude threshold. In some cases, the UE 115 may then fill in the peaks with pre-determined values below the clipping threshold. However, in some cases, such clipping techniques may distort the signal, may result in increased complexity (e.g., decoding complexities, signal reconstruction complexities, etc.) at a receiving device (e.g., at a base station 105).

Some PAs may exhibit non-linear behavior if operated at very high input power. This non-linearity may result in in-band and out-of-band distortion of the signal, and thus degraded EVM at a receiving device. To avoid the non-linearity, the PA may be operated at a mean input power that is lower (e.g., several dB lower) than the saturation point. If a signal has a PAPR of x dB, an input backoff (IBO) of x dB may be implemented to avoid the non-linearity even at the peak of the input signal. OFDM signals may be known to suffer from significant PAPR that grows rapidly with the size of the block. Some wireless communications systems (e.g., 5G NR systems) aim for higher data-rates (e.g., higher data-rates than LTE), which means the OFDM block-size may be larger, further increasing the PAPR. The existing PAPR reduction techniques may be data-dependent and computationally expensive, making them unfit for a real-time implementation. As a result, clipping and filtering (CF) is most commonly used in the industry. CF may result in in-band distortion and may not guarantee convergence to a desirable solution.

Compared to the previous generation of cellular networks, 4G-LTE and 5G-NR may provide an abundance of bandwidth both in the uplink and downlink. This is true both due to the addition of Frequency Range 2 (FR2) in 5G-NR as well as increasing the available bandwidth to 100 MHz in the sub-6 GHz (sub6) frequency. This excess bandwidth may be partially exploited by using longer OFDM symbols, which further increases the PAPR for OFDM. On the other hand, the excess bandwidth may also be exploited for PAPR reduction via tone reservation techniques. Tone reservation may allow the transmitter to utilize some of the otherwise-idle tones for reducing the PAPR. The magnitude and the phase of the reserved tones (e.g., of PRTs) may be optimized for a given OFDM symbol to minimize the PAPR. Given that there is no overlap between the data tones and PRTs, such techniques may not introduce any EVM or ACLR. The receiver may simply ignore the signal on the reserved tones and only decode the data tones.

While the magnitude and the phase of the reserved tones may be adjusted for each OFDM symbol, one or more aspects of the techniques described herein may provide for a universally good index allocation for the PRTs. In some examples, fixing the location of the PRT(s) in advance may significantly improve the complexity of the transmitter, since the optimization needs not be done in real time. Fixing the location of the PRT(s) may also reduce the signaling overhead (e.g., if the location of the PRTs is fixed in advance, there is no need for the transmitter to inform the receiver of PRT locations). For instance, a UE 115 may be granted 2 RB=24 tones for transmission, and the UE 115 may desire to use half of the available tones as PRT. The UE 115 may choose any subset of the 24 available tones as long as the base station 105 is made aware of this choice (through signaling or fixed in advance). For instance, the UE 115 may obtain a transmission waveform by taking the IDFT of the a signal (e.g., a signal in the frequency or tone domain) including PRT and the data signal (e.g., where a peak-cancelation signal on the PRT(s) may reduce the peaks associated with the transmission waveform).

Wireless communications systems may implement signal-to-clipping noise power reduction (SCR)-tone reservation (TR) techniques. For example, if a UE 115 is granted N tones {1, . . . , N}, the techniques may let Φ be a subset of the granted tones {1, . . . , N} corresponding to the PRT location. Naturally, the data tones may be allocated to the remaining tones, {1, . . . , N}\Φ. SCR-TR techniques may then construct a frequency domain kernel:

$$P_i = \begin{cases} 1 & \text{if } i \in \Phi \\ 0 & \text{if } i \in [N]\backslash\Phi \end{cases}$$

where p=if ft(P). Further, where X may be the frequency-domain data, $X_i$=0, if i∈Φ. Let x=if ft(X).

For such SCR-TR techniques, the time-domain kernel p may look like a narrow delta if the number of reserved tones is sufficiently large and the locations are chosen properly. Circularly shifting p in the time-domain may not impact the location of reserved tones in the frequency-domain (e.g., it may only disturb their phase). Further SCR-TR techniques may find the location of the largest peak of x (e.g., let j∈[LN] be the index). The SCR-TR techniques may circularly shift p so that the peaks are aligned (e.g., p$^j$=circshift (p,j)). The SCR-TR techniques may subtract scaled and shifted p from x to obtain $$x_{new} = x - \frac{|x(j)| - \mu}{p(0)} p_j e^{i \angle x(j)},$$

where μ is the target peak, ∢ x(j) is the phase of x(j), i=√−1. Then the SCR-TR techniques may iterate several times to reduce several peaks.

For the SCR-TR technique, it may be desirable to fix the location of the PRTs to produce a kernel with reasonable shape. A pseudo-random choice may perform well, as it yields a sharp and narrow kernel in the time-domain (e.g., a pseudo-random PRT pattern may result in a kernel with one narrow peak which is the only prominent peak of the kernel). For instance, if contiguous tones are used for PRTs, the produced kernel may be too wide in shape. The techniques described herein may provide for a good PRT index allocation (e.g., for PRT patterns or PRT configuration) that may be applied in various scenarios (e.g., universally) by a transmitting device for improved PAPR. In other words, one or more aspects of the techniques described herein (e.g., the Costas arrays and Costas array mappings to an allocated set of resources for indication of PRTs) may result in time-domain kernels which have a single narrow peak without any prominent side-lobes. As such, various kernels may be implemented to align with the peaks of a data signal to subtract the kernel from the signal (e.g., thus reducing PAPR in the time-domain).

As described herein, wireless communications system 100 may configure a subset of allocated resources (e.g., one or more REs of one or more allocated RBs) as PRTs for a peak-cancelation signal. For instance, wireless communications system 100 may configure a fixed PRT allocation based on a Costas array. In some examples, each column of a Costas array may correspond to a RB of a set of allocated resources. A transmitting device (e.g., a UE 115) may thus identify one or more PRT REs based on the Costas array and a mapping of allocated RBs to the columns of the Costas array. In other words, a transmitting device (e.g., a UE 115) may identify a pattern of PRT REs to use for a peak-cancellation signal based at least in part on a configured Costas array (e.g., where the peak-cancellation signal may reduce peaks of a corresponding data signal to ultimately reduce PAPR of an OFDM transmission including the data signal and the peak-cancellation signal).

Figure 2:
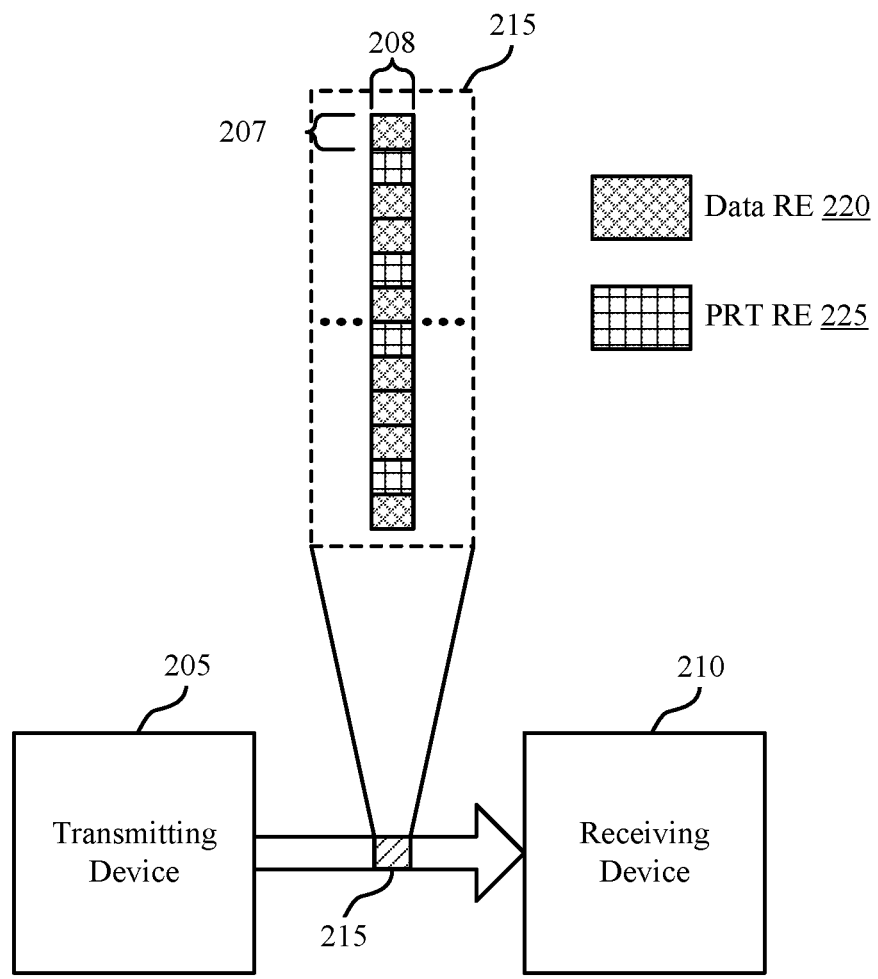
FIG. 2 illustrates an example of a wireless communications system that supports PAPR reduction with pseudo-random in-band tone reservation in accordance with aspects of the present disclosure.

FIG. 2 illustrates an example of a wireless communications system 200 that supports PAPR reduction with pseudo-random in-band tone reservation in accordance with aspects of the present disclosure. In some examples, wireless communications system 200 may implement aspects of wireless communications system 100. For instance, transmitting device 205 and receiving device 210 may be an example of a UE 115 and a base station 105, respectively, for uplink communications as described with reference to FIG. 1. Further, transmitting device 205 and receiving device 210 may be an example of a base station 105 and a UE 115, respectively, for downlink communications as also described with reference to FIG. 1. Wireless communications system 200 may illustrate an example in-band tone reservation (e.g., PRTs for a peak-cancellation signal) to reduce PAPR associated with a transmission 215.

Transmitting device 205 may transmit transmission 215 to receiving device 210. Transmission 215 may span a set of REs. Each RE may span a set of frequencies (e.g., a subcarrier 207) and a duration of time (e.g., time duration 208, which may include, for example, a symbol). In some examples, the transmission 215 may convey information (e.g., data) to receiving device 210 using OFDM. However, as described herein, OFDM signals may be associated with higher PAPRs compared to signals modulated using other schemes. As such, OFDM signals may be more likely to be clipped by a PA. Such clipping may be more detrimental as a size of a constellation increases (e.g., from 4 QAM to 256 QAM to 1024 QAM and so on).

As described herein, wireless communications system 200 may implement PRTs (e.g., PRT REs 225) to reduce peaks associated with a transmission 215 (e.g., an OFDM transmission 215). A base station may allocate a set of resources, where the allocated set of resources may be configured to include data REs 220 (e.g., which may be referred to as active REs) and PRT REs 225 (e.g., which may be referred to as reserved REs, inactive REs, tone reservation REs, peak-cancelation signal REs, etc.). As described herein, the configuration or pattern of the data REs 220 and the PRT REs 225 within the set of allocated resources may be based on a mapping of allocated RBs to columns of a Costas array (e.g., a Costas array may be implemented by wireless communications system 200 to configure data REs 220 and PRT REs 225 within the set of allocated resources).

PRT REs 225 may include a peak-cancelling signal that lowers the PAPR of transmission 215 in the time-domain. The signals transmitted in the PRT REs 225 may carry a signal that minimizes or reduces the PAPR of the signal by lowering the peaks of transmission 215 in the time-domain (e.g., a time-domain peak-cancellation signal transmitted via PRT REs 225 may be subtracted from a time-domain data signal transmitted via data REs 220 such that the PAPR of the transmission 215 including the peak-cancellation signal and the data signal may be reduced). Upon receiving the transmission 215, the receiving device 210 may identify the REs that are data REs 220 and the REs that are the PRT REs 225 used for PAPR reduction based on the configuration (e.g., based on a configured or specified Costas array). In some cases, the receiving device 210 may reconstruct a data signal (e.g., a data waveform) via adding the peak-cancelation signal back to the data signal to achieve the original waveform. In other cases, the receiving device 210 may ignore the PRT REs 225 and decode the data REs 220.

In some examples, by using the PRT REs 225 to lower the PAPR, a lower BO may be used for a working point of a PA of the transmitting device 205. As such, increased PA efficiency may be achieved due to using PRT REs 225 and increased spectral efficiency may be achieved (e.g., for OFDM communications). Generally, the techniques as described herein may be used to increase spectral efficiency. For instance, the techniques as described herein may increase a capability of transmission 215 to meet EVM constraints. Additionally, the techniques as described herein may be used to increase PA efficiency. For instance, transmitting devices 205 performing the method as described herein may use a lower BO, have a higher PA working point, a higher efficiency, or a combination thereof compared to transmitting devices 205 whose transmissions do not use efficiently configured PRT REs 225.

For instance, the transmitting device 205 may generate a data signal with multiple peaks (e.g., amplitude peaks). To lower a PAPR of the data signal, the transmitting device 205 may generate a peak-cancellation signal based on the IDFT of the data signal (e.g., such that the peak-cancellation signal may reduce the peaks of the data signal and the overall transmission 215 (e.g., where the transmission 215 includes the peak-cancellation signal and the data signal). The receiving device 210, upon receiving the transmission 215, may perform one or more procedures to generate (e.g., or reconstruct) a reconstructed data signal (e.g., which may be an approximate reconstruction of an original waveform of the data signal). The receiving device 210 may perform such one or more reconstruction procedures as clipped data signals 210 with clipped or reduced peaks may have blurrier or less easily decipherable constellations as opposed to the reconstructed data signals with reconstructed peaks.

As described herein, wireless communications system 200 may configure a subset of allocated resources (e.g., one or more REs of one or more RBs) as PRT REs 225 for a peak-cancelation signal. For instance, wireless communications system 200 may configure a fixed allocation of PRT REs 225 based on a Costas array (e.g., as described in more detail herein, for example, with reference to FIGS. 3-5). In some examples, each column of a Costas array may correspond to a RB of a set of allocated resources (e.g., of a set of allocated resources for a transmission 215). A transmitting device 205 may thus identify one or more PRT REs 225 based on the Costas array and a mapping of allocated RBs to the columns of the Costas array. For instance, a transmitting device 205 may identify a pattern of PRT REs 225 to use for a peak-cancellation signal based at least in part on a configured Costas array (e.g., where the peak-cancellation signal may reduce peaks of a corresponding data signal to ultimately reduce PAPR of a transmission 215 including the peak-cancellation signal and a corresponding data signal).

Generally, a base station may indicate (e.g., via control signaling) information on whether or not PRT REs 225 are to be implemented by the UE (e.g., and thus whether PRT RE 225 mapping to a Costas array is configured for the UE). The base station may further configure the mapping between resources allocated for the UE and the Costas array via control signaling. For instance, the base station may configure a pattern of PRT REs 225 for peak-cancelation signaling based on the Costas array and various parameters indicated via control signaling. For example, a PDCCH may allocate a set of resources for an uplink transmission and the PDCCH may further include information on uplink PRT RE 225 patterns within the set of allocated resources. As used herein, control signaling may generally refer to PDCCH signaling, downlink control information (DCI), medium access control (MAC) control element (CE) signaling, radio resource control (RRC) signaling, among other examples.

For instance, the mapping between a Costas array and a set of allocated resources may configured based on one or more starting column indications (e.g., based on one or more indications of starting columns of the Costas array to be used for mapping the set of allocated resources to the Costas array). In some cases, the mapping between a Costas array and a set of allocated resources may configured based on an indication of a decimation factor (e.g., a spacing of RBs, within the set of allocated resources, that include PRT REs). Moreover, in some examples, a base station may transmit an indication of whether PRT(s) of one or more RBs adjacent to the set of allocated resources may be used (e.g., where PRT(s) of the adjacent RBs may also be mapped to the Costas array in accordance with indicated starting columns, decimation factors, etc.). In some examples, as described herein, one or more Costas arrays may be specified or preconfigured by a wireless communications system, and a mapping between allocated uplink resources and the one or more Costas arrays may be further configured by a base station via control signaling.

In some implementations, PRT RE 225 patterns within the set of allocated resources (e.g., a pattern of data REs 220 and PRT REs 225 indicated by a configured mapping between the set of allocated resources and a Costas array) may be configured based on target PAPR and target throughput considerations. More aggressive reduction of PAPR may result in more PRT REs 225 used for peak-cancellation signaling (e.g., more data signal peaks may, in some cases, be reduced via implementation of relatively more PRT REs 225). However, higher data throughput targets may result in less PRT REs 225 used for peak-cancellation signaling. In some examples, the pattern of PRT REs 225 may be configured based on resource availability (e.g., based on how many REs in a symbol or a slot are available for PRTs), based on channel conditions (e.g., the pattern, periodicity, spacing, etc. of PRT REs used for peak-cancellation signaling may be based on channel conditions or blockers associated with frequency of the channel), among other examples.

Figure 3:
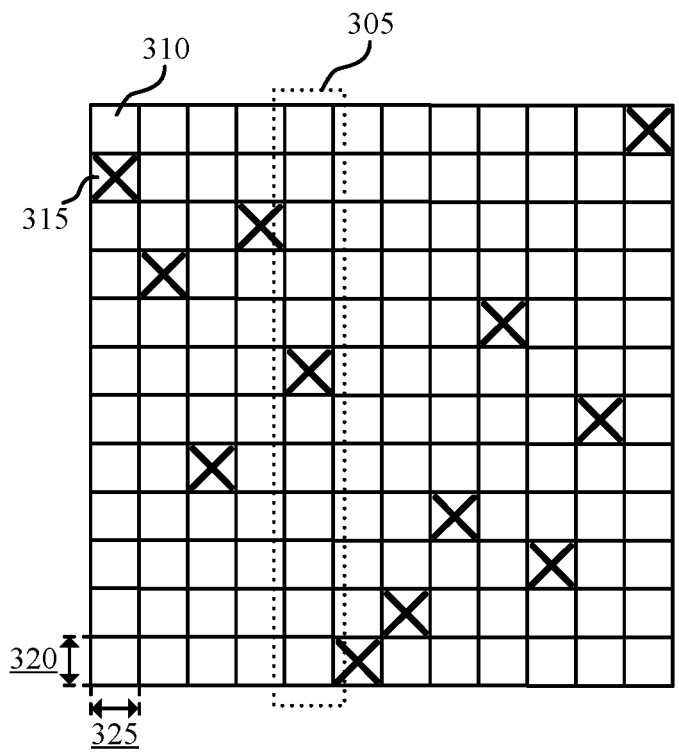
FIG. 3 illustrates an example of a peak reduction tone (PRT) configuration that supports PAPR reduction with pseudo-random in-band tone reservation in accordance with aspects of the present disclosure.

FIG. 3 illustrates an example of a PRT configuration 300 that supports PAPR reduction with pseudo-random in-band tone reservation in accordance with aspects of the present disclosure. In some examples, PRT configuration 300 may implement aspects of wireless communications system 100 and/or wireless communications system 200. For example, PRT configuration 300 may illustrate how a UE 115 and a base station 105 may identify a mapping between each RB of a set of allocated resources and a respective column of the Costas array (e.g., such that the UE 115 may transmit a peak-cancellation signal via the identified PRTs, known to both the UE 115 and the base station 105, for PAPR reduction). In the present example, the set of allocated resources may include twelve RBs 305.

PRT configuration 300 may illustrate a set of allocated resources (e.g., a set of uplink resources allocated to a UE 115) including a number of RBs 305. Generally, RBs 305 may be configured with a pattern of data REs 310 and PRT REs 315 as described herein. A RB 305 may refer to a frequency-time resource including some number of REs. In the present example, a RB 305 may refer to a frequency-time resource including twelve REs in the frequency domain and one RE in the time domain. Further, REs (e.g., data REs 310 and PRT REs 315) may each refer to a frequency-time resource spanning a subcarrier 320 in frequency and a symbol 325 in time.

Further, as described herein, wireless communications systems may specify or preconfigure (e.g., and thus base stations 105 and UEs 115 in the wireless communications system may mutually agree to) one or more Costas arrays for configuration of PRT REs 315 within an allocated set of resources (e.g., where the PRT REs 315 may be configured or indicated via configured mapping of the RBs 305 to columns of the Costas array). In one example embodiment, such a Costas array may include a twelve by twelve Costas array based on a multiplicative group for prime p=13 and primitive element 2 (e.g., as shown below).

$$CostasArray_{12\times12} = \begin{bmatrix} 0 & 0 & 0 & 0 & 0 & 0 & 0 & 0 & 0 & 0 & 0 & 1 \\ 1 & 0 & 0 & 0 & 0 & 0 & 0 & 0 & 0 & 0 & 0 & 0 \\ 0 & 0 & 0 & 1 & 0 & 0 & 0 & 0 & 0 & 0 & 0 & 0 \\ 0 & 1 & 0 & 0 & 0 & 0 & 0 & 0 & 0 & 0 & 0 & 0 \\ 0 & 0 & 0 & 0 & 0 & 0 & 0 & 1 & 0 & 0 & 0 & 0 \\ 0 & 0 & 0 & 0 & 1 & 0 & 0 & 0 & 0 & 0 & 0 & 0 \\ 0 & 0 & 0 & 0 & 0 & 0 & 0 & 0 & 0 & 0 & 1 & 0 \\ 0 & 0 & 1 & 0 & 0 & 0 & 0 & 0 & 0 & 0 & 0 & 0 \\ 0 & 0 & 0 & 0 & 0 & 0 & 1 & 0 & 0 & 0 & 0 & 0 \\ 0 & 0 & 0 & 0 & 0 & 0 & 0 & 0 & 1 & 0 & 0 & 0 \\ 0 & 0 & 0 & 0 & 0 & 1 & 0 & 0 & 0 & 0 & 0 & 0 \\ 0 & 0 & 0 & 0 & 1 & 0 & 0 & 0 & 0 & 0 & 0 & 0 \end{bmatrix}$$

Each RB 305 of an allocated set of resources may map to a column of the Costas array (e.g., such as the CostasArray$_{12\times12}$) and the column of the Costas array may indicate the pattern of PRT REs 315 and data REs 310 within the corresponding RB 305 (e.g., where '0' may correspond to a data RE 310 or a tone to include data signaling and '1' may correspond to a PRT RE 315 or a tone to include peak-cancellation signaling). The CostasArray$_{12\times12}$ may be implemented configure one PRT RE 315 in every RB 305. A UE 115 and a base station 105 may ready column by column of the Costas array in order to get the PRT configuration for a sequence of allocated RBs. In some cases, the base station may indicate a starting column of the Costas array to be used to start the PRT configuration, and the PRTs for subsequent RBs may be identified based on reading through the Costas array column by column to the right from the indicated starting column.

In some examples, if the starting column is not 1, then after reaching the last column of the array, the UE may go back to column 1 and continue until the indicated started column minus one. For instance, in examples where a base station indicates the starting column to be 11 and the UE is allocated 4 RBs, the UE may use RE 7 as PRT for his first RB, RE 1 as PRT for his second RB, RE 2 as PRT for his third RB, and RE 4 as PRT for his fourth RB.

In some cases, one or more starting columns may be indicated by the base station. For instance for a set of allocated resources including 24 RBs, a base station may indicate two starting columns (e.g., as a new starting column of the Costas array may be used for each of the two sets of 12 RBs of the allocated 24 RBs). In other words, in some examples, after 12 RBs of the set of allocated resources are mapped to the CostasArray$_{12\times12}$, a different column of the CostasArray$_{12\times12}$ may be used to resume mapping of additional RBs of the set of allocated resources (e.g., to avoid periodic repetition of PRT locations). For sets of allocated resources exceeding the dimension of an implemented Costas array (e.g., for sets of allocated resources including more than 12 RBs) further RBs exceeding the capacity of the Costas array may be mapped to the Costas array using a different starting column of the Costas array (e.g., where the different starting columns may be configured/indicated by the base station). In some examples, for large resource allocations (e.g., in cases where 36 or more RBs are allocated to a UE), the base station and the UE may fall back to a larger Costas array (e.g., such as a CostasArray$_{36\times36}$ which may be based on a multiplicative group for prime p=37 and primitive element 2).

In an example where the set of resources allocated to the UE includes 12 RBs and no starting column of the CostasArray$_{12\times12}$ is indicated (or where the first column of the CostasArray$_{12\times12}$ is indicated as the starting column), the PRT REs 315 may be configured as illustrated in the example PRT configuration 300. That is, in an example where the set of resources allocated to the UE includes 12 RBs and no starting column of the CostasArray$_{12\times12}$ is indicated (or where the first column of the CostasArray$_{12\times12}$ is indicated as the starting column), the first column may indicate a first PRT in a second RE of a first RB corresponding to the first column of the CostasArray$_{12\times12}$, a second column may indicate a second PRT in a fourth RE of a second RB corresponding to the second column of the CostasArray$_{12\times12}$, a third column may indicate a third PRT in a eighth RE of a third RB corresponding to the third column of the CostasArray$_{12\times12}$, a fourth column may indicate a fourth PRT in a third RE of a fourth RB corresponding to the fourth column of the CostasArray$_{12\times12}$, a fifth column may indicate a fifth PRT in a sixth RE of a fifth RB corresponding to the fifth column of the CostasArray$_{12\times12}$, a sixth column may indicate a sixth PRT in a twelfth RE of a sixth RB corresponding to the sixth column of the CostasArray$_{12\times12}$, a seventh column may indicate a seventh PRT in a eleventh RE of a seventh RB corresponding to the seventh column of the CostasArray$_{12\times12}$, an eighth column may indicate an eighth PRT in a ninth RE of an eighth RB corresponding to the eighth column of the CostasArray$_{12\times12}$, a ninth column may indicate a ninth PRT in a fifth RE of a ninth RB corresponding to the ninth column of the CostasArray$_{12\times12}$, a tenth column may indicate a tenth PRT in a tenth RE of a tenth RB corresponding to the tenth column of the CostasArray$_{12\times12}$, an eleventh column may indicate an eleventh PRT in a seventh RE of an eleventh RB corresponding to the eleventh column of the CostasArray$_{12\times12}$, and a twelfth column may indicate a twelfth PRT in a first RE of a twelfth RB corresponding to the twelfth column of the CostasArray$_{12\times12}$.

The example of FIG. 3 is illustrated for descriptive purposes and is not intended to be limiting in terms of scope of the present disclosure. Various other Costas arrays may be implemented, various starting columns, decimation factors, or other parameters may be implemented, etc. by analogy, without departing from the scope of the present disclosure. For example, devices communicating in a wireless communications system may employ different starting columns of CostasArray$_{12\times12}$ (e.g., column 2, column 3, etc.) for mapping 12 RBs of a set of allocated resources to patterns of PRT REs 315 and data REs 310 as indicated via cycling through CostasArray$_{12\times12}$.

Figure 4:
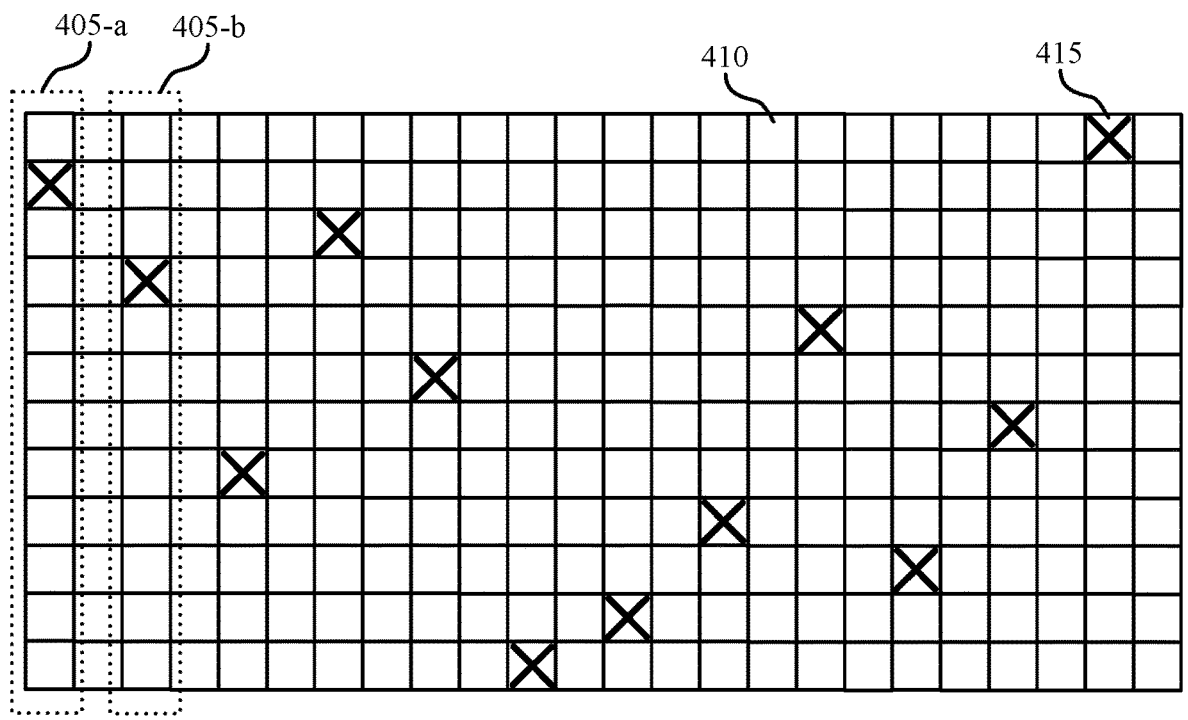
FIG. 4 illustrates an example of a PRT configuration that supports PAPR reduction with pseudo-random in-band tone reservation in accordance with aspects of the present disclosure.

FIG. 4 illustrates an example of a PRT configuration 400 that supports PAPR reduction with pseudo-random in-band tone reservation in accordance with aspects of the present disclosure. In some examples, PRT configuration 400 may implement aspects of wireless communications system 100 and/or wireless communications system 200. For example, PRT configuration 400 may illustrate how a UE 115 and a base station 105 may identify a mapping between each RB of a set of allocated resources and a respective column of the Costas array (e.g., such that the UE 115 may transmit a peak-cancellation signal via the identified PRTs, known to both the UE 115 and the base station 105, for PAPR reduction).

PRT configuration 400 may illustrate a set of allocated resources (e.g., a set of uplink resources allocated to a UE 115) including a number of RBs 405. Generally, RBs 405 may be configured with a pattern of data REs 410 and PRT REs 415 as described herein. A RB 405 may refer to a frequency-time resource including some number of REs. In the present example, a RB 405 may refer to a frequency-time resource including twelve REs in the frequency domain and one RE in the time domain. Further, REs (e.g., data REs 410 and PRT REs 415) may each refer to a frequency-time resource spanning a subcarrier in frequency and a symbol in time. In the present example, the set of allocated resources may include twenty-four RBs 405.

Further, as described herein, wireless communications systems may specify or preconfigure (e.g., and thus base stations 105 and UEs 115 in the wireless communications system may mutually agree to) one or more Costas arrays for configuration of PRT REs 415 within an allocated set of resources (e.g., where the PRT REs 415 may be configured or indicated via configured mapping of the RBs 405 to columns of the Costas array). In one example embodiment, the set of allocated resources may exceed the dimension of an implemented Costas array (e.g., twenty-four allocated RBs 405 may exceed the dimensions of CostasArray$_{12\times12}$) a decimation factor may be implemented (e.g., rather than recycling through the CostasArray$_{12\times12}$ using different starting columns configured/indicated by the base station). For instance, the example PRT configuration 400 may illustrate implementation of a decimation factor of two, where every other RB 405 may be mapped to the CostasArray$_{12\times12}$. For example, a first RB 405-a may be mapped to the first column of the CostasArray$_{12\times12}$, a second RB 405 may be skipped (or all tones/REs of the second RB 405 may be used for data), a third RB 405-b may be mapped to the second column of the CostasArray$_{12\times12}$, and so on.

The example of FIG. 4 is illustrated for descriptive purposes and is not intended to be limiting in terms of scope of the present disclosure. Various other Costas arrays may be implemented, various starting columns, decimation factors, or other parameters may be implemented, etc. by analogy, without departing from the scope of the present disclosure. For example, devices communicating in a wireless communications system may employ various decimation factors (e.g., 2, 3, etc.), may employ combination of both decimation factors and indications of different starting columns, etc.

Figure 5:
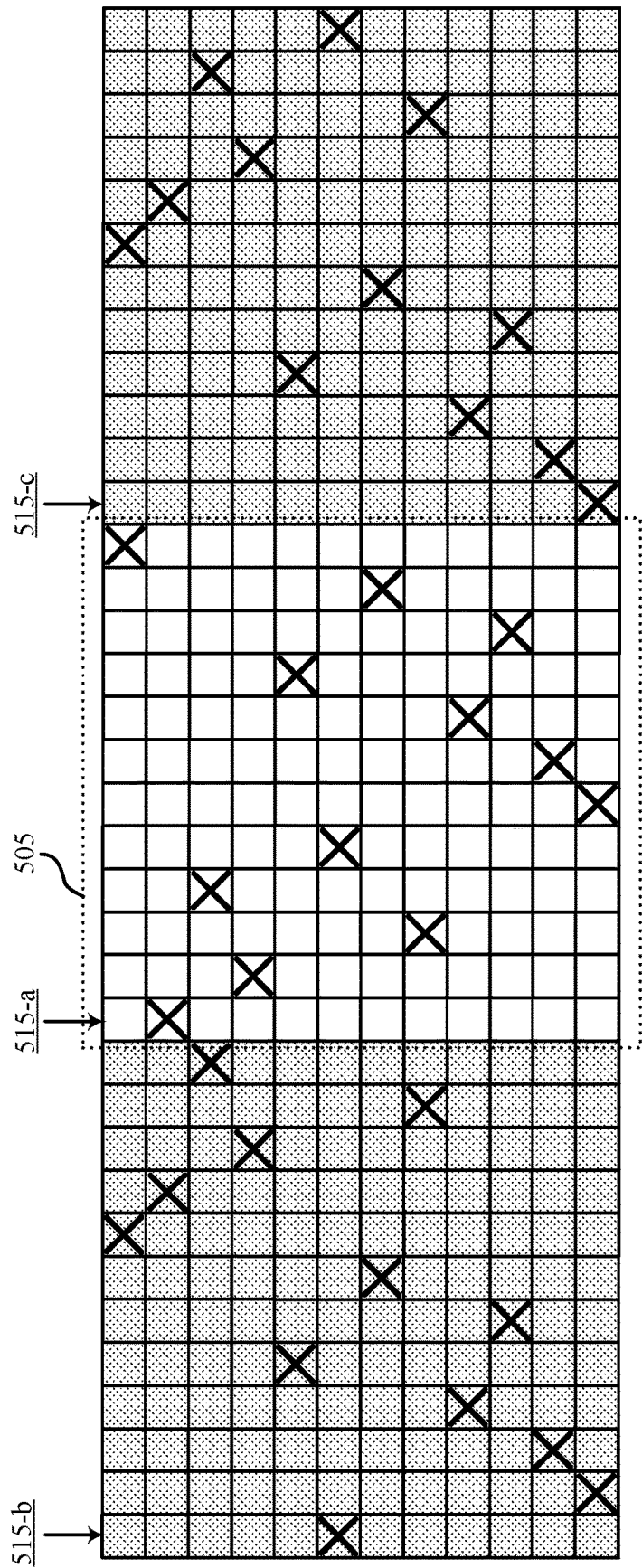
FIG. 5 illustrates an example of a PRT configuration that supports PAPR reduction with pseudo-random in-band tone reservation in accordance with aspects of the present disclosure.

FIG. 5 illustrates an example of a PRT configuration 500 that supports PAPR reduction with pseudo-random in-band tone reservation in accordance with aspects of the present disclosure. In some examples, PRT configuration 500 may implement aspects of wireless communications system 100 and/or wireless communications system 200. For example, PRT configuration 500 may illustrate how a UE 115 and a base station 105 may identify a mapping between each RB of a set of allocated resources and a respective column of the Costas array (e.g., such that the UE 115 may transmit a peak-cancellation signal via the identified PRTs, known to both the UE 115 and the base station 105, for PAPR reduction).

PRT configuration 500 may illustrate a set of allocated resources 505 (e.g., a set of uplink resources allocated to a UE 115) including a number of RBs (e.g., twelve RBs in the present example). Generally, RBs within the allocated resources 505 may be configured with a pattern of data REs and PRT REs as described herein. A RB may refer to a frequency-time resource including some number of REs. In the present example, a RB may refer to a frequency-time resource including twelve REs in the frequency domain and one RE in the time domain. Further, REs (e.g., data REs and PRT REs) may each refer to a frequency-time resource spanning a subcarrier in frequency and a symbol in time. In the present example, the set of allocated resources 505 may include twelve RBs.

Further, as described herein, wireless communications systems may specify or preconfigure (e.g., and thus base stations 105 and UEs 115 in the wireless communications system may mutually agree to) one or more Costas arrays for configuration of PRT REs within an allocated set of resources (e.g., where the PRT REs may be configured or indicated via configured mapping of the RBs to columns of the Costas array). In one example embodiment, wireless communications systems (e.g., a base station) may configure a UE to use adjacent resources 510 (e.g., adjacent RBs) for PRTs. In such cases, for a UE allocated m RBs (e.g., where m=12 in the present example), dynamic indication of whether the UE is allowed to use the PRT REs in the adjacent 2*m RBs may be supported (e.g., where m RBs may be included in adjacent resources of higher frequency and m RBs may be included in adjacent resources of lower frequency). In such cases, adjacent resources 510 may be used for PRT (peak-cancellation signaling) and not for transmitting data (e.g., the UE may use one RE for PRT per RB of adjacent resources 510).

In some examples, two bits may be used to indicate whether the UE is allowed to use the PRT REs in the adjacent resources 510 (e.g., where one bit may indicate whether the UE is allowed to use the PRT REs in the left adjacent resources 510 and another bit may indicate whether the UE is allowed to use the PRT REs in the right adjacent resources 510). In other examples, the signaling (e.g., the signaling indicating whether the UE is allowed to use the PRT REs in the adjacent resources 510) may be symmetric to reduce the overhead. For instance, one bit may indicate whether or not the UE can use the 2*m adjacent RBs (e.g., meaning that the UE is either allowed to use both higher frequency and lower frequency adjacent RBs, or the UE is not allowed to use either).

As discussed herein, RBs exceeding the capacity of the Costas array may be mapped to the Costas array using a different starting column of the Costas array (e.g., where the different starting columns may be configured/indicated by the base station). Such may be applicable to examples where a UE is configured to use adjacent resources 510 for PRTs. For instance an indication 515-a may be transmitted by a base station to a UE which may indicate the UE is to use a first starting column of the CostasArray$_{12\times12}$ for the allocated resources 505 (e.g., where in some cases the allocated resources 505 may be referred to as the "internal part"). In some cases, the UE may default (e.g., in the absence of a starting column indication) to using the first column of the CostasArray$_{12\times12}$ (or some other preconfigured column of the CostasArray$_{12\times12}$) for allocated resources 505.

In the illustrated example, an indication 515-b may be transmitted by a base station to a UE which may indicate the UE is to use a fifth starting column of the CostasArray$_{12\times12}$ for the adjacent resources 510 to the left of allocated resources 505 (e.g., where adjacent resources 510 to the left of allocated resources 505 may generally refer to adjacent resources 510 in another band, in another frequency region, in another cell, etc. compared to allocated resources 505). In the illustrated example, an indication 515-c may be transmitted by a base station to a UE which may indicate the UE is to use a sixth starting column of the CostasArray$_{12\times12}$ for the adjacent resources 510 to the right of allocated resources 505 (e.g., where adjacent resources 510 to the right of allocated resources 505 may generally refer to adjacent resources 510 in another band, in another frequency region, in another cell, etc. compared to allocated resources 505).

The example of FIG. 5 is illustrated for descriptive purposes and is not intended to be limiting in terms of scope of the present disclosure. Various other Costas arrays may be implemented, various starting columns, decimation factors, or other parameters may be implemented, etc. by analogy, without departing from the scope of the present disclosure. For example, devices communicating in a wireless communications system may employ various decimation factors (e.g., 2, 3, etc.), may employ combination of both decimation factors and indications of different starting columns, may employ more or less adjacent resources 510 for PRTs (e.g., relative to 2*m RBs), etc.

Figure 6:
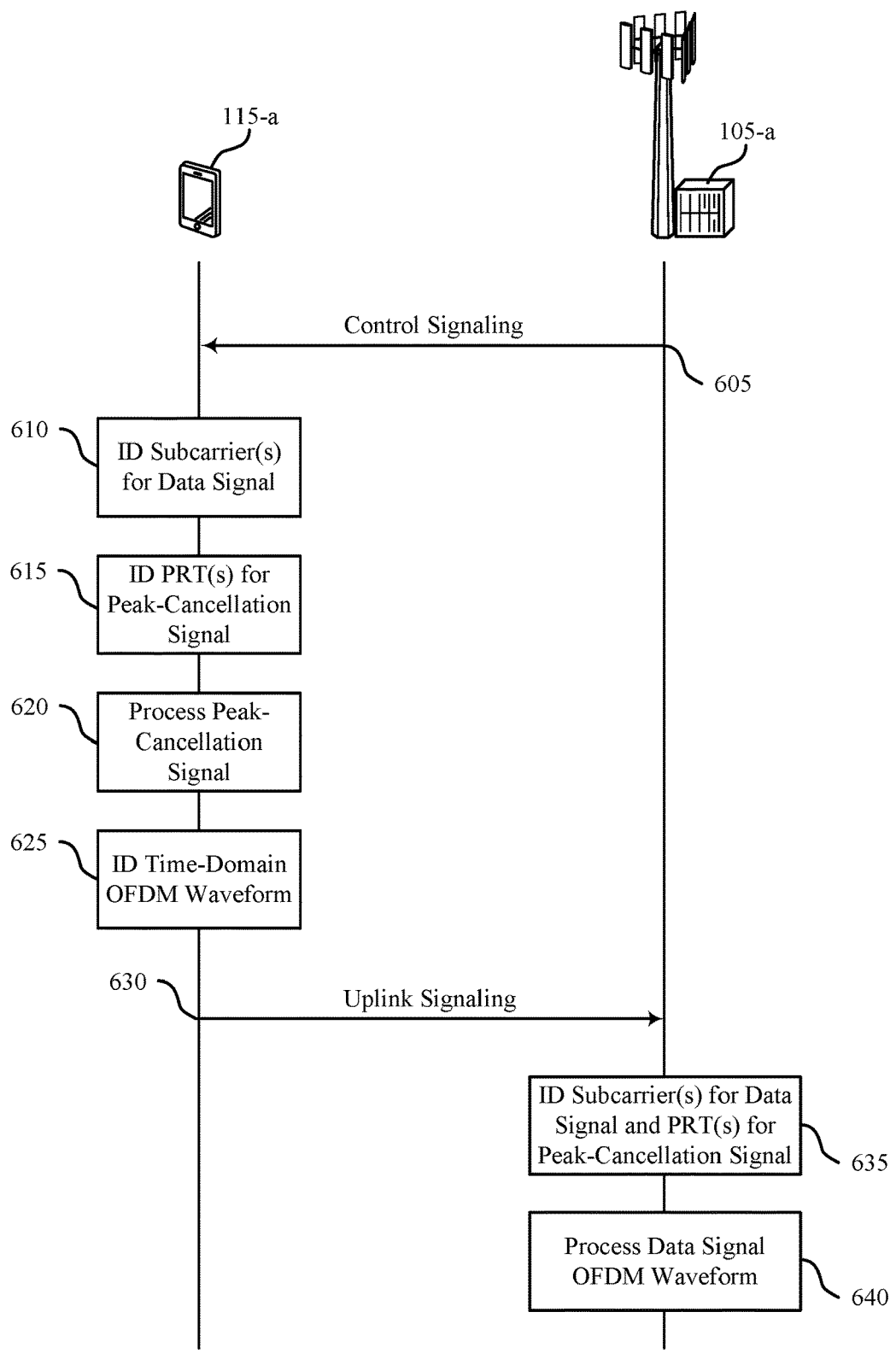
FIG. 6 illustrates an example of a process flow that supports PAPR reduction with pseudo-random in-band tone reservation in accordance with aspects of the present disclosure.

FIG. 6 illustrates an example of a process flow 600 that supports PAPR reduction with pseudo-random in-band tone reservation in accordance with aspects of the present disclosure. In some examples, process flow 600 may implement aspects of the techniques described with reference to FIGS. 1-5. Process flow 600 may be implemented by a UE 115-a and a base station 105-a, which may be examples of a UE 115 and a base station 105 described with reference to FIGS. 1 and 2. In the following description of the process flow 600, the operations between the UE 115-a and the base station 105-a may be transmitted in a different order than the order shown, or the operations performed by the base station 105-a and the UE 115-a may be performed in different orders or at different times. Certain operations may also be left out of the process flow 600, or other operations may be added to the process flow 600. It is to be understood that while the base station 105-a and the UE 115-a are shown performing a number of the operations of process flow 600, any wireless device may perform the operations shown.

Generally process flow 600 may illustrate usage of PRT (e.g., which may be activated through a signal, such as control signaling, sent by the base station 105-a to the UE 115-a). The base station 105-a may indicate the initial column of the Costas array (e.g., which may be specified or preconfigured by the network or between the base station 105-a and the UE 115-a) even for the "internal part" or the allocated resources (e.g., in addition to RBs of the allocated resources that exceed the dimensions of the Costas array, in addition to RBs of adjacent resources that exceed the dimensions of the Costas array, etc.). Such may serve several purposes. For instance, such may maximize the overlap between the PRT sequence of two adjacent UEs in order to reduce the total number of REs "wasted" for peak reduction. Such may minimize the overlap of the PRTs of a UE 115-a with the data tones of an adjacent UE (e.g., a neighbor UE using the adjacent resources for its own data transmissions).

The base station 105-a may also indicate the new starting column after the internal part of 12 RBs has ended (e.g., in the example where CostasArray$_{12 \times 12}$ is implemented). This may be done with the same two criteria is mind (e.g., the considerations of maximizing the overlap between the PRT sequence of two adjacent UEs in order to reduce the total number of REs "wasted" for peak reduction and/or minimizing the overlap of the PRTs of a UE 115-a with the data tones of an adjacent UE). In some cases, the decimation factor may be indicated by the base station 105-a either to reduce the density of the PRTs, or to skip the allocated RBs to an adjacent UE. If a UE 115-a is allowed to use the adjacent 2*m RBs for peak reduction, the UE 115-a may follow power constraints (e.g., where the peak-cancellation signal on the PRTs satisfies a power budget threshold associated with the uplink transmission period) for the PRTs within these two adjacent bands. Such may all be handled by the network (e.g., the base station 105-a) via DCI, MAC-CE, RRC signaling, etc.

In some examples, the UE 115-a may transmit a capability indication to the base station 105-a. In some cases, the capability may be a capability of the UE 115-a to support PRT REs, Costas array mapping to RBs, etc. The capability indication may include one or more bits indicating if the UE 115-a has such capabilities. For example, in some implementations, the capability indication may include a single bit to indicate the UE 115-a is capable of PRT REs, and thus may implicitly indicate the UE 115-a is capable of identifying Costas array mapping to RBs. In other implementations, the capability indication may include an explicit indication for each capability of the UE 115-a relating to PRT (e.g., or SCR-TR) capabilities. In some implementations, the indication may be transmitted via RRC signaling.

At 605, the base station 105-a may transmit control signaling to the UE 115-a. Generally, the control signaling may indicate whether PRTs are to be implemented by UE 115-a, the configuration of PRTs (e.g., a mapping of allocated resources to a Costas array, a pattern of PRT REs, a pattern of REs for peak-cancellation signaling, an index or starting column of a Costas array where uplink PRT REs start, an offset or starting column of a Costas array where uplink PRT REs for a certain set of RBs within a set of allocated resources, a decimation factor or a spacing or periodicity for mapping of RBs to columns of the Costas array, among other examples). Generally, the control signaling may configure the mapping of a set of resources allocated to the UE 115-a to one or more columns of a Costas array (e.g., where the mapping thus indicates a pattern of PRTs within the set of allocated resources). For instance, the control signaling may indicate that the UE 115-a is to utilize one or more PRTs for an uplink transmission period.

At 610, the UE 115-a identify, from a set of allocated resources, first subcarriers (e.g., one or more subcarriers of one or more allocated RBs) for transmitting a data signal.

At 615, the UE 115-a may identify the one or more PRTs for transmitting a peak-cancellation signal based on a Costas array. As described herein, in addition to the Costas array, the one or more PRTs for transmitting a peak-cancellation signal may further be identified based on any mapping parameters (e.g., such as indications of starting columns for different sets of allocated resources, indications of decimation factors, indications to use adjacent resources for PRTs, etc.) indicated to the UE 115-a via the control signaling from the base station 105-a.

At 620, the UE 115-a may process the peak-cancellation signal for transmission on the one or more PRTs based on a waveform of the data signal. For example, the UE 115-a may process or determine the peak-cancellation signal for transmission on the one or more PRTs based on peaks associated with the data signal, the relative amplitudes of peaks associated with the data signal, the quantity of available REs for the PRTs (e.g., how many PRT REs are available for the peak-cancellation signal), etc.

At 625, the UE 115-a may identify a time-domain OFDM waveform based on an IDFT of the one or more PRTs (e.g., which may be referred to as PRT REs) and one or more data tones (e.g., which may be referred to as data REs) associated with the first subcarriers (e.g., the data subcarriers or the REs including data signaling). As described, in some cases, the identified time-domain OFDM waveform includes the data signal with the peak-cancellation signal.

At 630, the UE 115-a may transmit the uplink signaling (e.g., the UE 115-a may transmit the OFDM waveform including the data signal with the peak-cancellation signal.

At 635, the base station 105-a may identify, from a set of allocated resources, first subcarriers for receiving the data signal and the one or more PRTs for transmitting a peak-cancellation signal based on a Costas array.

At 640, the base station 105-a may process the data signal (e.g., decode the data signal from the received OFDA waveform) based on the identified first subcarriers for receiving the data signal and the one or more PRTs for transmitting a peak-cancellation signal.

Figure 7:
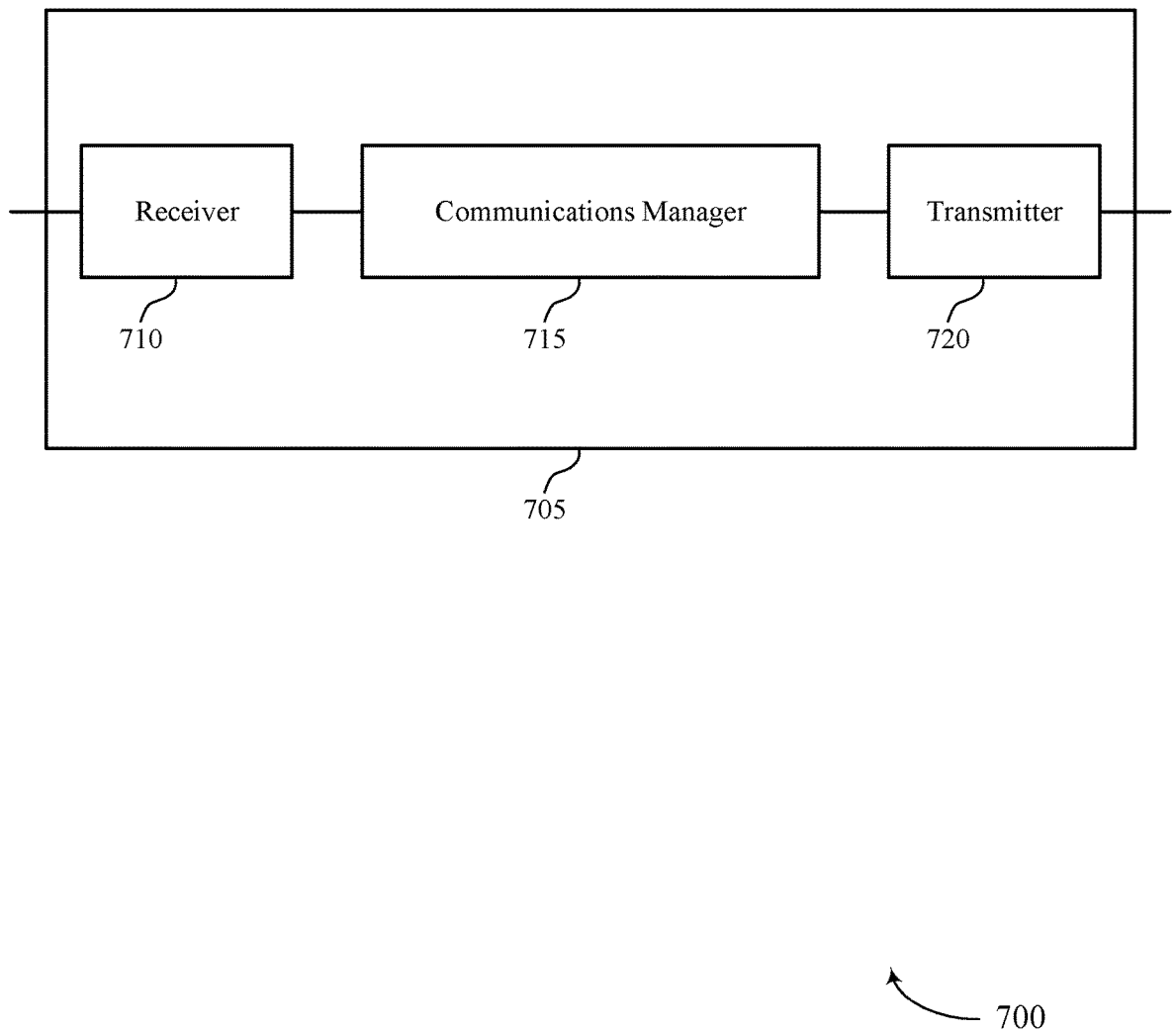
FIGS. 7 and 8 show block diagrams of devices that support PAPR reduction with pseudo-random in-band tone reservation in accordance with aspects of the present disclosure.

FIG. 7 shows a block diagram 700 of a device 705 that supports PAPR reduction with pseudo-random in-band tone reservation in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to PAPR reduction with pseudo-random in-band tone reservation, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may receive a control signal indicating that the UE is to utilize one or more PRTs for an uplink transmission period, identify the one or more PRTs for transmitting a peak-cancellation signal based on a Costas array, identify, from a set of allocated resources, first subcarriers for transmitting a data signal, and transmit, during the uplink transmission period, the data signal on the first subcarriers of the set of allocated resources with the peak-cancellation signal on the one or more PRTs of the set of allocated resources. The communications manager 715 may be an example of aspects of the communications manager 910 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 920 described with reference to FIG. 9. The transmitter 720 may utilize a single antenna or a set of antennas.

Figure 8:
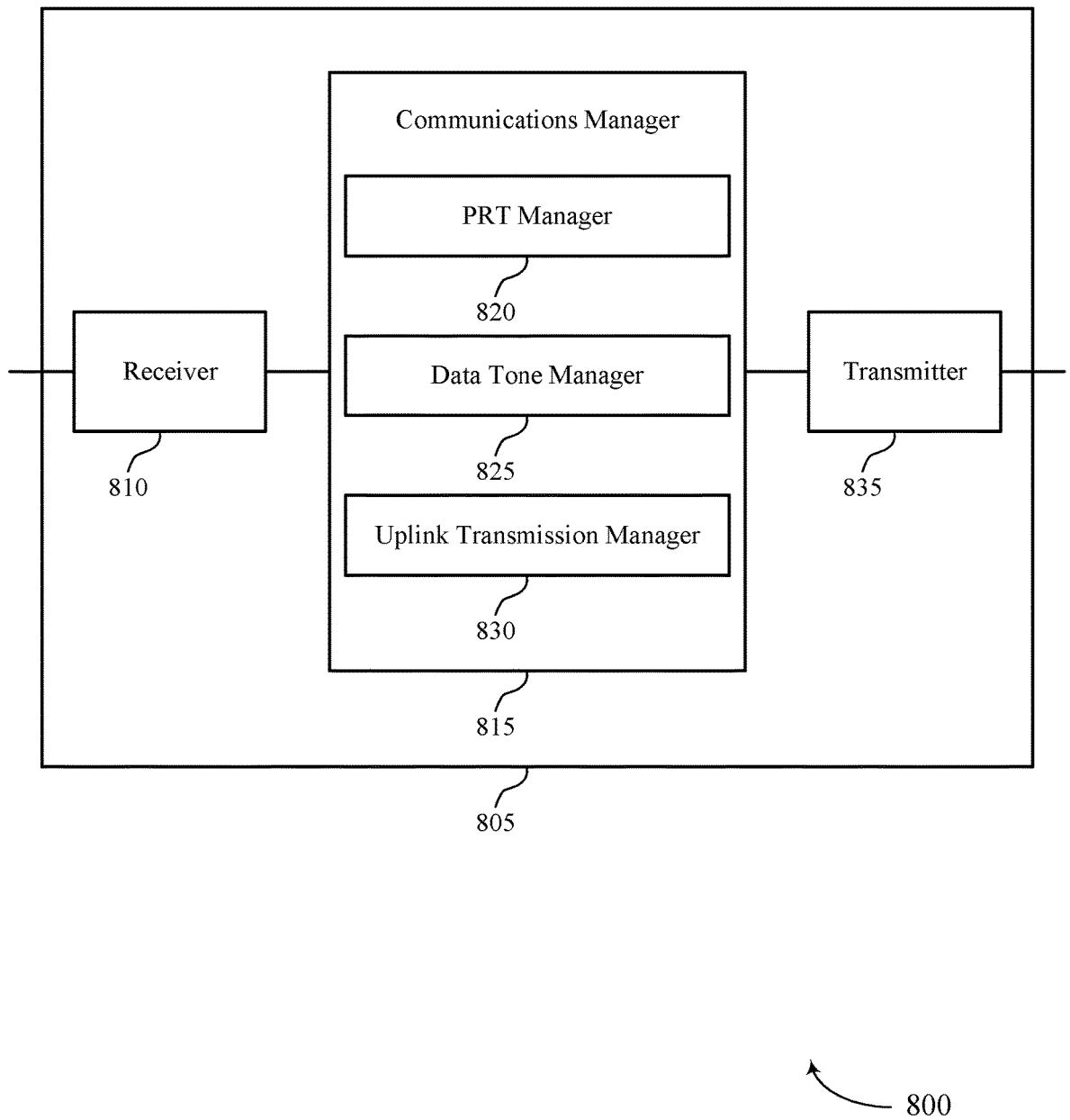

FIG. 8 shows a block diagram 800 of a device 805 that supports PAPR reduction with pseudo-random in-band tone reservation in accordance with aspects of the present disclosure. The device 805 may be an example of aspects of a device 705, or a UE 115 as described herein. The device 805 may include a receiver 810, a communications manager 815, and a transmitter 835. The device 805 may also include a processor. Each of these components may be in communication with one another (e.g., via one or more buses).

The receiver 810 may receive information such as packets, user data, or control information associated with various information channels (e.g., control channels, data channels, and information related to PAPR reduction with pseudo-random in-band tone reservation, etc.). Information may be passed on to other components of the device 805. The receiver 810 may be an example of aspects of the transceiver 920 described with reference to FIG. 9. The receiver 810 may utilize a single antenna or a set of antennas.

The communications manager 815 may be an example of aspects of the communications manager 715 as described herein. The communications manager 815 may include a PRT manager 820, a data tone manager 825, and an uplink transmission manager 830. The communications manager 815 may be an example of aspects of the communications manager 910 described herein.

The PRT manager 820 may receive a control signal indicating that the UE is to utilize one or more PRTs for an uplink transmission period and identify the one or more PRTs for transmitting a peak-cancellation signal based on a Costas array. The data tone manager 825 may identify, from a set of allocated resources, first subcarriers for transmitting a data signal. The uplink transmission manager 830 may transmit, during the uplink transmission period, the data signal on the first subcarriers of the set of allocated resources with the peak-cancellation signal on the one or more PRTs of the set of allocated resources.

The transmitter 835 may transmit signals generated by other components of the device 805. In some examples, the transmitter 835 may be collocated with a receiver 810 in a transceiver module. For example, the transmitter 835 may be an example of aspects of the transceiver 920 described with reference to FIG. 9. The transmitter 835 may utilize a single antenna or a set of antennas.

Figure 9:
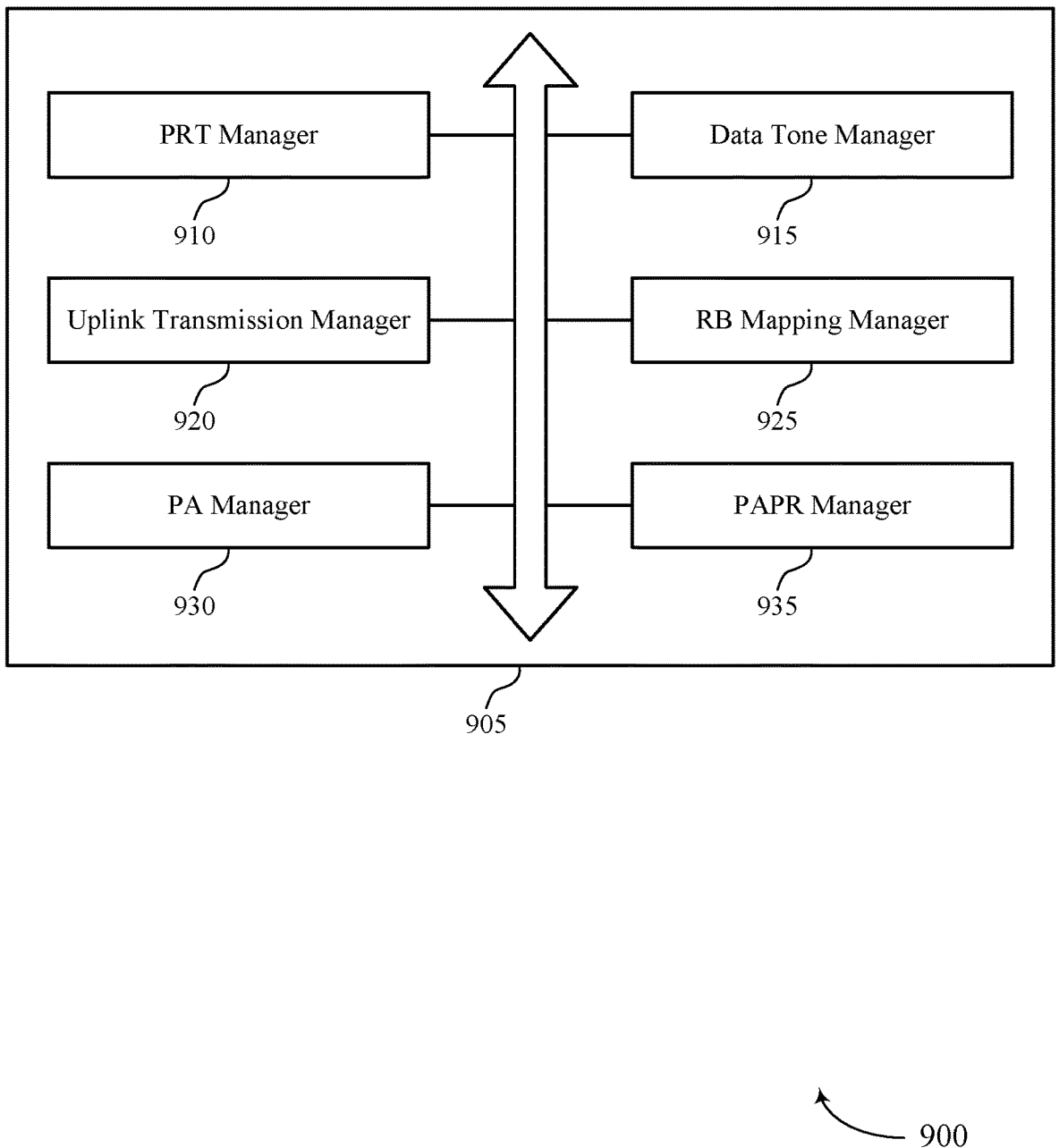
FIG. 9 shows a block diagram of a communications manager that supports PAPR reduction with pseudo-random in-band tone reservation in accordance with aspects of the present disclosure.

FIG. 9 shows a block diagram 900 of a communications manager 905 that supports PAPR reduction with pseudo-random in-band tone reservation in accordance with aspects of the present disclosure. The communications manager 905 may be an example of aspects of a communications manager 715, a communications manager 815, or a communications manager 910 described herein. The communications manager 905 may include a PRT manager 910, a data tone manager 915, an uplink transmission manager 920, a RB mapping manager 925, a PA manager 930, and a PAPR manager 935. Each of these modules may communicate, directly or indirectly, with one another (e.g., via one or more buses).

The PRT manager 910 may receive a control signal indicating that the UE is to utilize one or more PRTs for an uplink transmission period. In some examples, the PRT manager 910 may identify the one or more PRTs for transmitting a peak-cancellation signal based on a Costas array. In some examples, the PRT manager 910 may identify a RE from each RB based on a row of the respective column of the Costas array, where the one or more PRTs for the peak-cancellation signal are identified based on the identified RE from each RB. In some examples, the PRT manager 910 may receive an indication to use one or more RBs adjacent to the set of allocated resources for PRTs, where the one or more PRTs are identified based on the one or more RBs adjacent to the set of allocated resources.

In some examples, the PRT manager 910 may identify one RE in every RB of the set of allocated resources, where the one RE is allocated as a PRT. In some examples, identifying the Costas array based on identifying a number of RBs associated with the set of allocated resources exceeds a threshold, where the Costas array includes a thirty six by thirty six Costas array. In some cases, the Costas array is based on a primitive element equal to two and a prime number equal to thirteen. In some cases, the Costas array includes a twelve by twelve Costas array.

In some cases, the Costas array includes a first column indicating a first PRT in a second RE of a first RB corresponding to the first column, a second column indicating a second PRT in a fourth RE of a second RB corresponding to the second column, a third column indicating a third PRT in a eighth RE of a third RB corresponding to the third column, a fourth column indicating a fourth PRT in a third RE of a fourth RB corresponding to the fourth column, a fifth column indicating a fifth PRT in a sixth RE of a fifth RB corresponding to the fifth column, a sixth column indicating a sixth PRT in a twelfth RE of a sixth RB corresponding to the sixth column, a seventh column indicating a seventh PRT in a eleventh RE of a seventh RB corresponding to the seventh column, an eighth column indicating an eighth PRT in a ninth RE of an eighth RB corresponding to the eighth column, a ninth column indicating a ninth PRT in a fifth RE of a ninth RB corresponding to the ninth column, a tenth column indicating a tenth PRT in a tenth RE of a tenth RB corresponding to the tenth column, an eleventh column indicating an eleventh PRT in a seventh RE of an eleventh RB corresponding to the eleventh column, and a twelfth column indicating a twelfth PRT in a first RE of a twelfth RB corresponding to the twelfth column.

In some cases, each column of the Costas array indicates, for a respective RB of the set of allocated resources, a RE for a PRT and each column of the Costas array indicates a different position for the RE within the respective RB. In some cases, the Costas array is based on a primitive element equal to two and a prime number equal to thirty-seven.

The data tone manager 915 may identify, from a set of allocated resources, first subcarriers for transmitting a data signal.

The uplink transmission manager 920 may transmit, during the uplink transmission period, the data signal on the first subcarriers of the set of allocated resources with the peak-cancellation signal on the one or more PRTs of the set of allocated resources. In some examples, identifying a time-domain OFDM waveform based on an inverse discrete Fourier transform of the one or more PRTs and one or more data tones associated with the first subcarriers, where the identified time-domain OFDM waveform includes the data signal with the peak-cancellation signal.

The RB mapping manager 925 may identify a first mapping between each RB of the set of allocated resources and a respective column of the Costas array. In some examples, the RB mapping manager 925 may receive a first indication of a first starting column of the Costas array, where the first mapping is identified based on the first starting column of the Costas array. In some examples, the RB mapping manager 925 may receive a second indication of a second starting column of the Costas array. In some examples, the RB mapping manager 925 may identify a second mapping between a subset of RBs of the set of allocated resources and the respective column of the Costas array, where the second mapping is identified based on the second starting column of the Costas array.

In some examples, the RB mapping manager 925 may identify a set of subsets of RBs of the set of allocated resources, where each subset of the set includes a quantity of RBs equivalent to a number of columns of the Costas array. In some examples, the RB mapping manager 925 may identify a different starting column of the Costas array for each of the subsets, where the first mapping between each RB of the set of allocated resources and the respective column of the Costas array is based on the different starting column of the Costas array. In some examples, the RB mapping manager 925 may identify a decimation factor for the first mapping between each RB of the set of allocated resources and a respective column of the Costas array, where the first mapping is identified based on the decimation factor.

In some examples, the RB mapping manager 925 may receive an indication of the decimation factor, where the decimation factor is identified based on the indication. In some examples, the RB mapping manager 925 may identify a first quantity of RBs associated with the set of allocated resources. In some examples, the RB mapping manager 925 may identify a second quantity of the one or more RBs adjacent to the set of allocated resources for PRTs based on the first quantity and the received second indication. In some cases, the decimation factor indicates a pattern of a first set of RBs used entirely for data and a second set of RBs each respectively including at least one RE for PRTs.

The PA manager 930 may identify a transmission power level based on the received second indication to use one or more RBs adjacent to the set of allocated resources for PRTs.

The PAPR manager 935 may process the peak-cancellation signal for transmission on the one or more PRTs based on a waveform of the data signal. In some cases, the peak-cancellation signal reduces a PAPR associated with the data signal based on the processing. In some cases, the peak-cancellation signal satisfies a power budget threshold associated with the uplink transmission period based on the processing.

Figure 10:
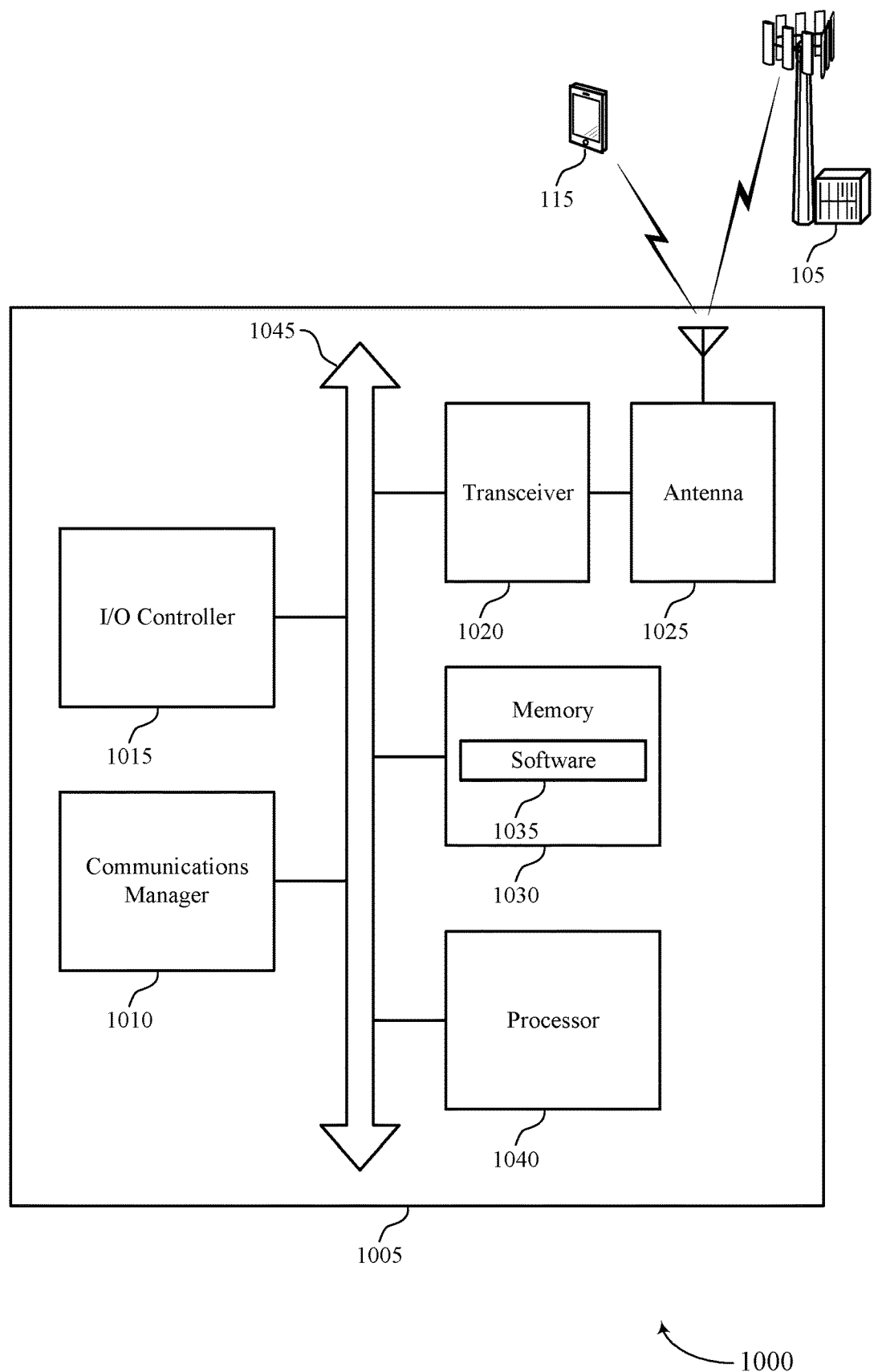
FIG. 10 shows a diagram of a system including a device that supports PAPR reduction with pseudo-random in-band tone reservation in accordance with aspects of the present disclosure.

FIG. 10 shows a diagram of a system 1000 including a device 1005 that supports PAPR reduction with pseudo-random in-band tone reservation in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may receive a control signal indicating that the UE is to utilize one or more PRTs for an uplink transmission period, identify the one or more PRTs for transmitting a peak-cancellation signal based on a Costas array, identify, from a set of allocated resources, first subcarriers for transmitting a data signal, and transmit, during the uplink transmission period, the data signal on the first subcarriers of the set of allocated resources with the peak-cancellation signal on the one or more PRTs of the set of allocated resources.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include RAM and ROM. The memory 1030 may store computer-readable, computer-executable code or software 1035 including instructions that, when executed, cause the processor to perform various functions described herein. In some cases, the memory 1030 may contain, among other things, a BIOS which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting PAPR reduction with pseudo-random in-band tone reservation).

The software 1035 may include instructions to implement aspects of the present disclosure, including instructions to support wireless communications. The software 1035 may be stored in a non-transitory computer-readable medium such as system memory or other type of memory. In some cases, the software 1035 may not be directly executable by the processor 1040 but may cause a computer (e.g., when compiled and executed) to perform functions described herein.

Figure 11:
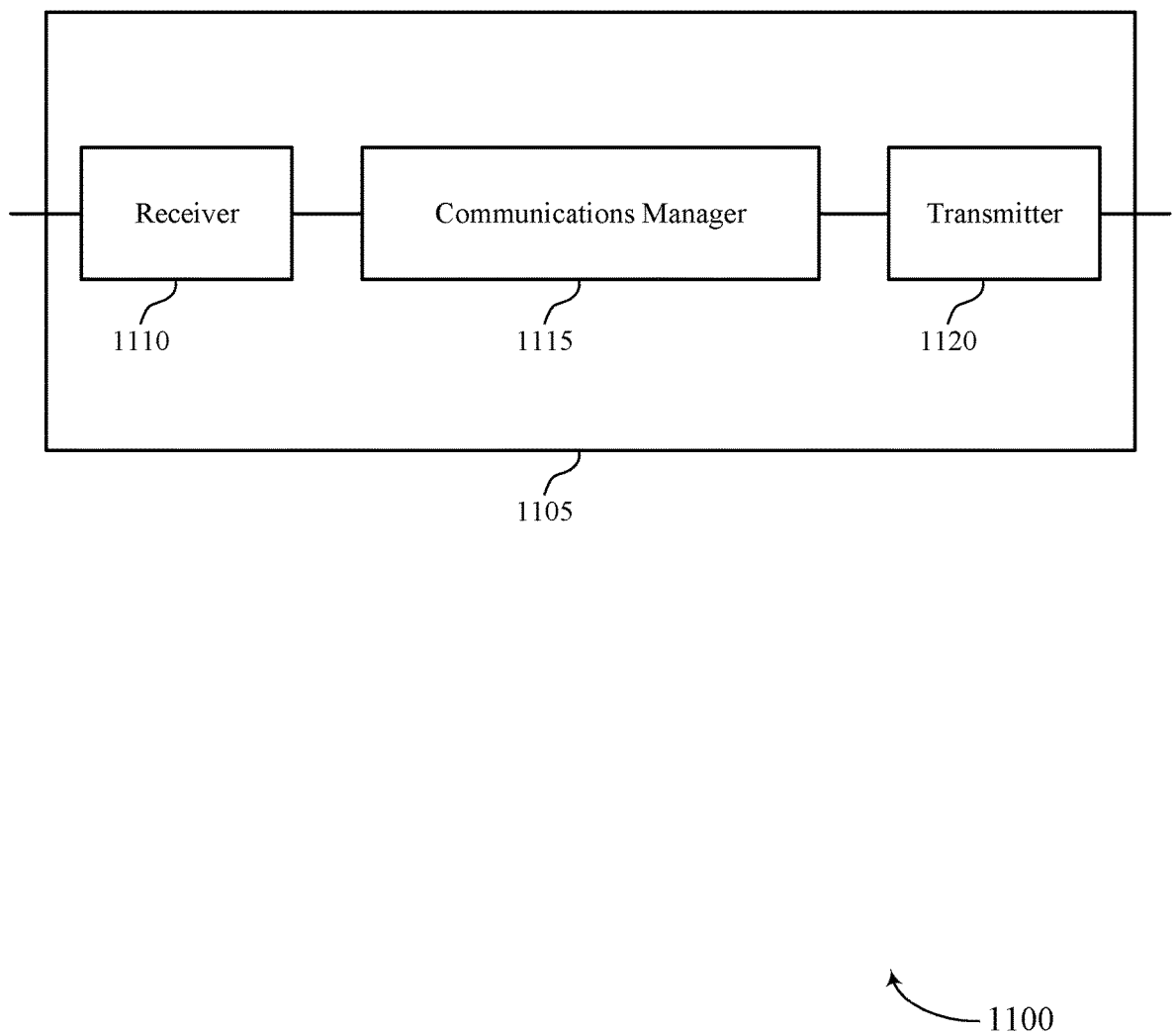
FIGS. 11 and 12 show block diagrams of devices that support PAPR reduction with pseudo-random in-band tone reservation in accordance with aspects of the present disclosure.

FIG. 11 shows a block diagram 1100 of a device 1105 that supports PAPR reduction with pseudo-random in-band tone reservation in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to PAPR reduction with pseudo-random in-band tone reservation, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may transmit a control signal indicating that a UE is to utilize one or more PRTs for an uplink transmission period, identify the one or more PRTs for UE transmission of a peak-cancellation signal based on a Costas array, identify, from a set of allocated resources, first subcarriers for receiving a data signal, and receive, during the uplink transmission period, the data signal on the first subcarriers of the set of allocated resources with the peak-cancellation signal on the one or more PRTs of the set of allocated resources. The communications manager 1115 may be an example of aspects of the communications manager 1310 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1320 described with reference to FIG. 13. The transmitter 1120 may utilize a single antenna or a set of antennas.

Figure 12:
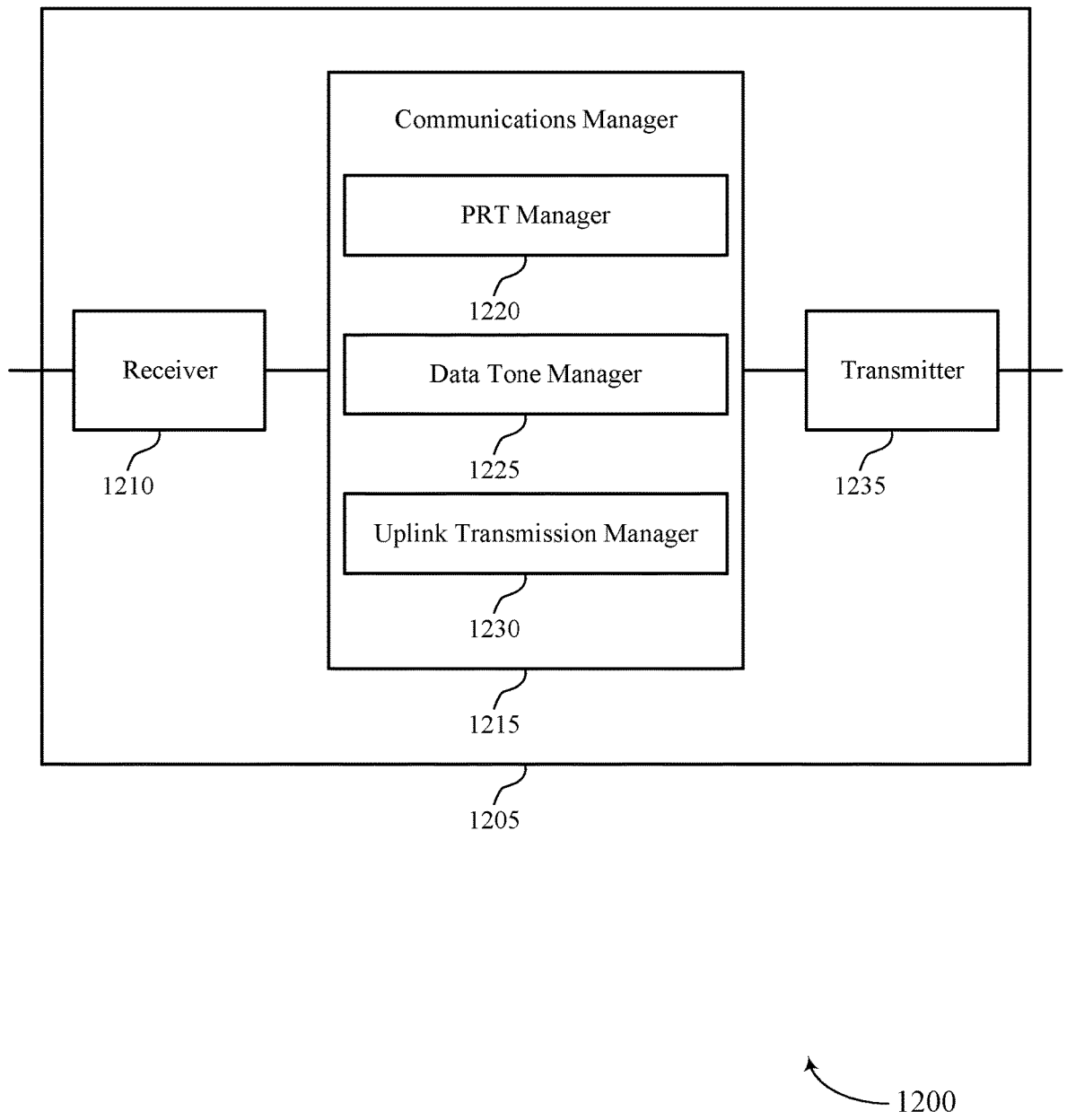

FIG. 12 shows a block diagram 1200 of a device 1205 that supports PAPR reduction with pseudo-random in-band tone reservation in accordance with aspects of the present disclosure. The device 1205 may be an example of aspects of a device 1105, or a base station 105 as described herein. The device 1205 may include a receiver 1210, a communications manager 1215, and a transmitter 1235. The device 1205 may also include a processor. Each of these components may be in communication with one another (e.g., via one or more buses).

The receiver 1210 may receive information such as packets, user data, or control information associated with various information channels (e.g., control channels, data channels, and information related to PAPR reduction with pseudo-random in-band tone reservation, etc.). Information may be passed on to other components of the device 1205. The receiver 1210 may be an example of aspects of the transceiver 1320 described with reference to FIG. 13. The receiver 1210 may utilize a single antenna or a set of antennas.

The communications manager 1215 may be an example of aspects of the communications manager 1115 as described herein. The communications manager 1215 may include a PRT manager 1220, a data tone manager 1225, and an uplink transmission manager 1230. The communications manager 1215 may be an example of aspects of the communications manager 1310 described herein.

The PRT manager 1220 may transmit a control signal indicating that a UE is to utilize one or more PRTs for an uplink transmission period and identify the one or more PRTs for UE transmission of a peak-cancellation signal based on a Costas array. The data tone manager 1225 may identify, from a set of allocated resources, first subcarriers for receiving a data signal. The uplink transmission manager 1230 may receive, during the uplink transmission period, the data signal on the first subcarriers of the set of allocated resources with the peak-cancellation signal on the one or more PRTs of the set of allocated resources.

The transmitter 1235 may transmit signals generated by other components of the device 1205. In some examples, the transmitter 1235 may be collocated with a receiver 1210 in a transceiver module. For example, the transmitter 1235 may be an example of aspects of the transceiver 1320 described with reference to FIG. 13. The transmitter 1235 may utilize a single antenna or a set of antennas.

Figure 13:
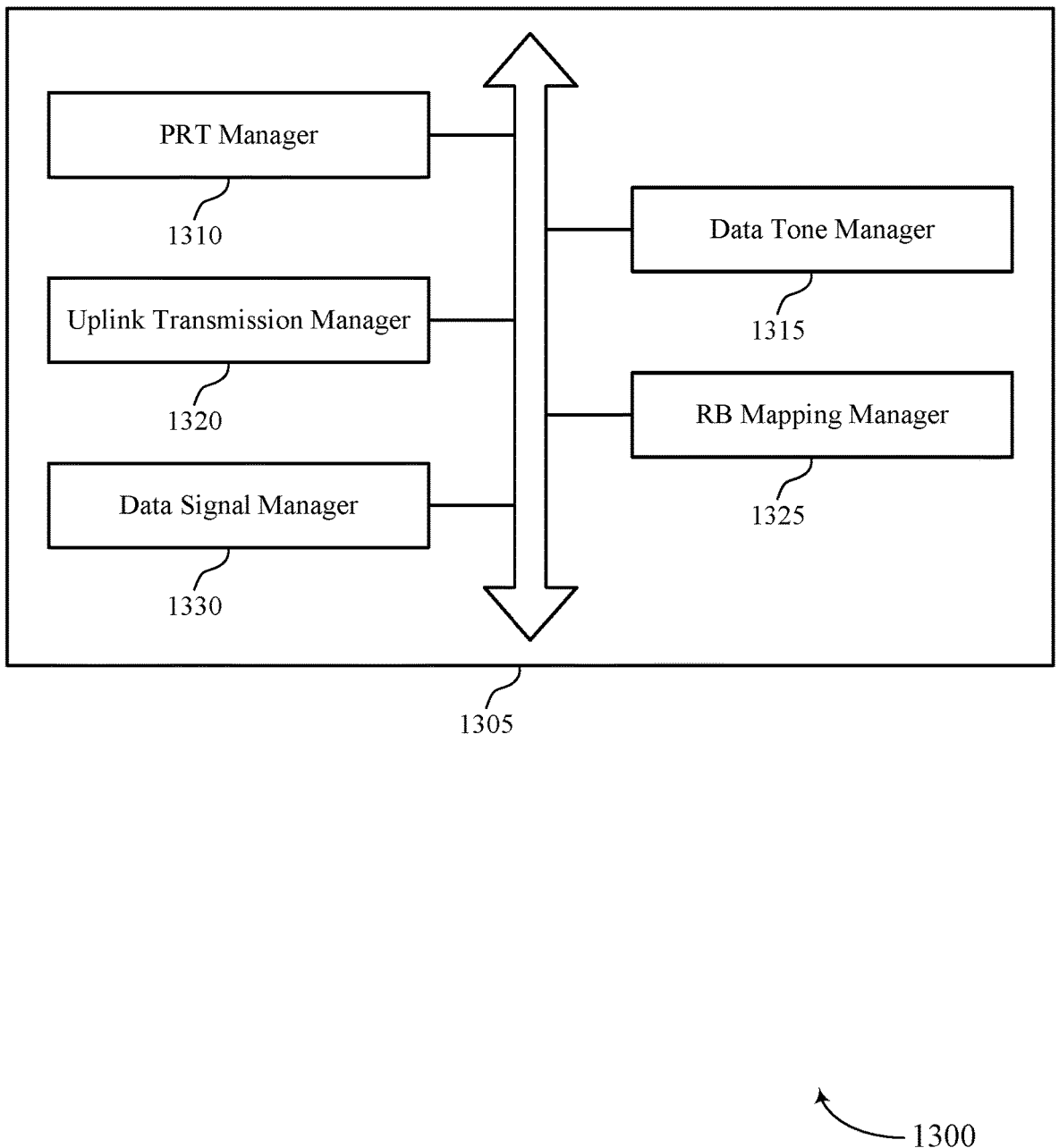
FIG. 13 shows a block diagram of a communications manager that supports PAPR reduction with pseudo-random in-band tone reservation in accordance with aspects of the present disclosure.

FIG. 13 shows a block diagram 1300 of a communications manager 1305 that supports PAPR reduction with pseudo-random in-band tone reservation in accordance with aspects of the present disclosure. The communications manager 1305 may be an example of aspects of a communications manager 1115, a communications manager 1215, or a communications manager 1310 described herein. The communications manager 1305 may include a PRT manager 1310, a data tone manager 1315, an uplink transmission manager 1320, a RB mapping manager 1325, and a data signal manager 1330. Each of these modules may communicate, directly or indirectly, with one another (e.g., via one or more buses).

The PRT manager 1310 may transmit a control signal indicating that a UE is to utilize one or more PRTs for an uplink transmission period. In some examples, the PRT manager 1310 may identify the one or more PRTs for UE transmission of a peak-cancellation signal based on a Costas array. In some examples, the PRT manager 1310 may identify a RE from each RB based on a row of the respective column of the Costas array, where the one or more PRTs for the peak-cancellation signal are identified based on the identified RE from each RB. In some examples, the PRT manager 1310 may transmit an indication to use one or more RBs adjacent to the set of allocated resources for PRTs, where the one or more PRTs are identified based on the one or more RBs adjacent to the set of allocated resources.

In some examples, the PRT manager 1310 may identify one RE in every RB of the set of allocated resources, where the one RE is allocated as a PRT. In some examples, identifying the Costas array based on identifying a number of RBs associated with the set of allocated resources exceeds a threshold, where the Costas array includes a thirty six by thirty six Costas array. In some examples, the PRT manager 1310 may identify the one or more PRTs and one or more data tones associated with the first subcarriers based on a fast Fourier transform of the time-domain OFDM waveform. In some cases, the Costas array is based on a primitive element equal to two and a prime number equal to thirteen. In some cases, the Costas array includes a twelve by twelve Costas array.

In some cases, the Costas array includes a first column indicating a first PRT in a second RE of a first RB corresponding to the first column, a second column indicating a second PRT in a fourth RE of a second RB corresponding to the second column, a third column indicating a third PRT in a eighth RE of a third RB corresponding to the third column, a fourth column indicating a fourth PRT in a third RE of a fourth RB corresponding to the fourth column, a fifth column indicating a fifth PRT in a sixth RE of a fifth RB corresponding to the fifth column, a sixth column indicating a sixth PRT in a twelfth RE of a sixth RB corresponding to the sixth column, a seventh column indicating a seventh PRT in a eleventh RE of a seventh RB corresponding to the seventh column, an eighth column indicating an eighth PRT in a ninth RE of an eighth RB corresponding to the eighth column, a ninth column indicating a ninth PRT in a fifth RE of a ninth RB corresponding to the ninth column, a tenth column indicating a tenth PRT in a tenth RE of a tenth RB corresponding to the tenth column, an eleventh column indicating an eleventh PRT in a seventh RE of an eleventh RB corresponding to the eleventh column, and a twelfth column indicating a twelfth PRT in a first RE of a twelfth RB corresponding to the twelfth column.

In some cases, each column of the Costas array indicates, for a respective RB of the set of allocated resources, a RE for a PRT and each column of the Costas array indicates a different position for the RE within the respective RB. In some cases, the Costas array is based on a primitive element equal to two and a prime number equal to thirty-seven.

The data tone manager 1315 may identify, from a set of allocated resources, first subcarriers for receiving a data signal.

The uplink transmission manager 1320 may receive, during the uplink transmission period, the data signal on the first subcarriers of the set of allocated resources with the peak-cancellation signal on the one or more PRTs of the set of allocated resources. In some examples, the uplink transmission manager 1320 may identify a transmission power level based on the received second indication to use one or more RBs adjacent to the set of allocated resources for PRTs, where the data signal and peak cancellation signal are received based on the identified transmission power level. In some examples, the uplink transmission manager 1320 may identify a time-domain OFDM waveform based on the receiving.

The RB mapping manager 1325 may identify a first mapping between each RB of the set of allocated resources and a respective column of the Costas array. In some examples, the RB mapping manager 1325 may transmit a first indication of a first starting column of the Costas array, where the first mapping is based on the first starting column of the Costas array. In some examples, the RB mapping manager 1325 may identify a second mapping between a subset of RBs of the set of allocated resources and the respective column of the Costas array. In some examples, the RB mapping manager 1325 may transmit a second indication of a second starting column of the Costas array, where the second mapping is based on the second starting column of the Costas array.

In some examples, the RB mapping manager 1325 may identify a set of subsets of RBs of the set of allocated resources, where each subset of the set includes a quantity of RBs equivalent to a number of columns of the Costas array. In some examples, the RB mapping manager 1325 may identify a different starting column of the Costas array for each of the subsets, where the first mapping between each RB of the set of allocated resources and the respective column of the Costas array is based on the different starting column of the Costas array. In some examples, the RB mapping manager 1325 may identify a decimation factor for the first mapping between each RB of the set of allocated resources and a respective column of the Costas array, where the first mapping is identified based on the decimation factor.

In some examples, the RB mapping manager 1325 may transmit an indication of the decimation factor, where the decimation factor is based on the indication. In some examples, the RB mapping manager 1325 may identify a first quantity of RBs associated with the set of allocated resources. In some examples, the RB mapping manager 1325 may identify a second quantity of the one or more RBs adjacent to the set of allocated resources for PRTs based on the first quantity and the received second indication. In some cases, the decimation factor indicates a pattern of a first set of RBs used entirely for data and a second set of RBs each respectively including at least one RE for PRTs.

The data signal manager 1330 may identify a waveform of the data signal based on processing the peak-cancellation signal on the one or more PRTs. In some cases, the peak-cancellation signal reduces a PAPR associated with the identified waveform. In some cases, the identified waveform satisfies a power budget threshold associated with the uplink transmission period.

Figure 14:
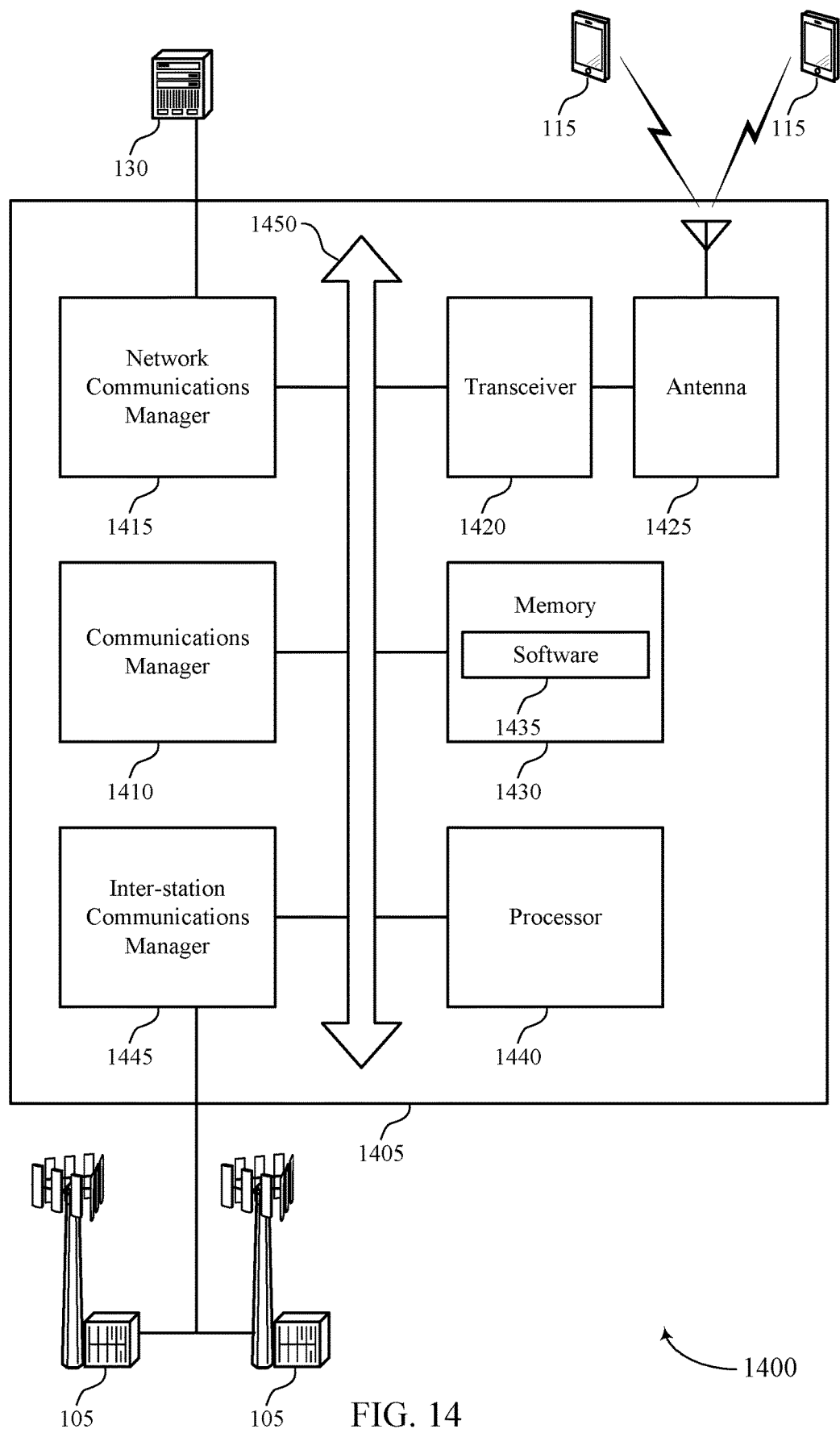
FIG. 14 shows a diagram of a system including a device that supports PAPR reduction with pseudo-random in-band tone reservation in accordance with aspects of the present disclosure.

FIG. 14 shows a diagram of a system 1400 including a device 1405 that supports PAPR reduction with pseudo-random in-band tone reservation in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may transmit a control signal indicating that a UE is to utilize one or more PRTs for an uplink transmission period, identify the one or more PRTs for UE transmission of a peak-cancellation signal based on a Costas array, identify, from a set of allocated resources, first subcarriers for receiving a data signal, and receive, during the uplink transmission period, the data signal on the first subcarriers of the set of allocated resources with the peak-cancellation signal on the one or more PRTs of the set of allocated resources.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code or software 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting PAPR reduction with pseudo-random in-band tone reservation).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The software 1435 may include instructions to implement aspects of the present disclosure, including instructions to support wireless communications. The software 1435 may be stored in a non-transitory computer-readable medium such as system memory or other type of memory. In some cases, the software 1435 may not be directly executable by the processor 1440 but may cause a computer (e.g., when compiled and executed) to perform functions described herein.

Figure 15:
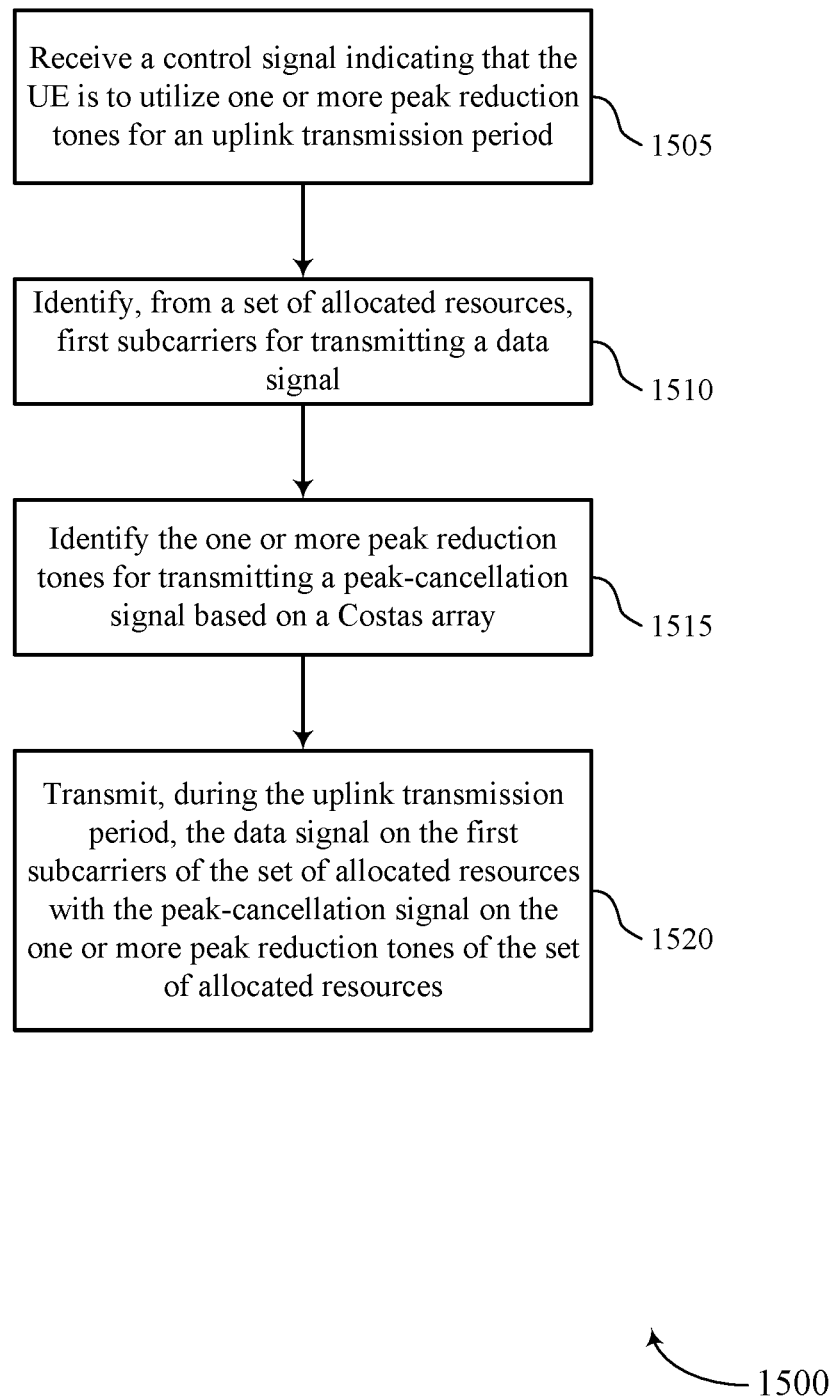
FIGS. 15 through 19 show flowcharts illustrating methods that support PAPR reduction with pseudo-random in-band tone reservation in accordance with aspects of the present disclosure.

FIG. 15 shows a flowchart illustrating a method 1500 that supports PAPR reduction with pseudo-random in-band tone reservation in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1505, the UE may receive a control signal indicating that the UE is to utilize one or more PRTs for an uplink transmission period. The operations of 1505 may be performed according to the methods described herein. In some examples, aspects of the operations of 1505 may be performed by a PRT manager as described with reference to FIGS. 7 through 10.

At 1510, the UE may identify, from a set of allocated resources, first subcarriers for transmitting a data signal. The operations of 1510 may be performed according to the methods described herein. In some examples, aspects of the operations of 1510 may be performed by a data tone manager as described with reference to FIGS. 7 through 10.

At 1515, the UE may identify the one or more PRTs for transmitting a peak-cancellation signal based on a Costas array. The operations of 1515 may be performed according to the methods described herein. In some examples, aspects of the operations of 1515 may be performed by a PRT manager as described with reference to FIGS. 7 through 10.

At 1520, the UE may transmit, during the uplink transmission period, the data signal on the first subcarriers of the set of allocated resources with the peak-cancellation signal on the one or more PRTs of the set of allocated resources. The operations of 1520 may be performed according to the methods described herein. In some examples, aspects of the operations of 1520 may be performed by an uplink transmission manager as described with reference to FIGS. 7 through 10.

Figure 16:
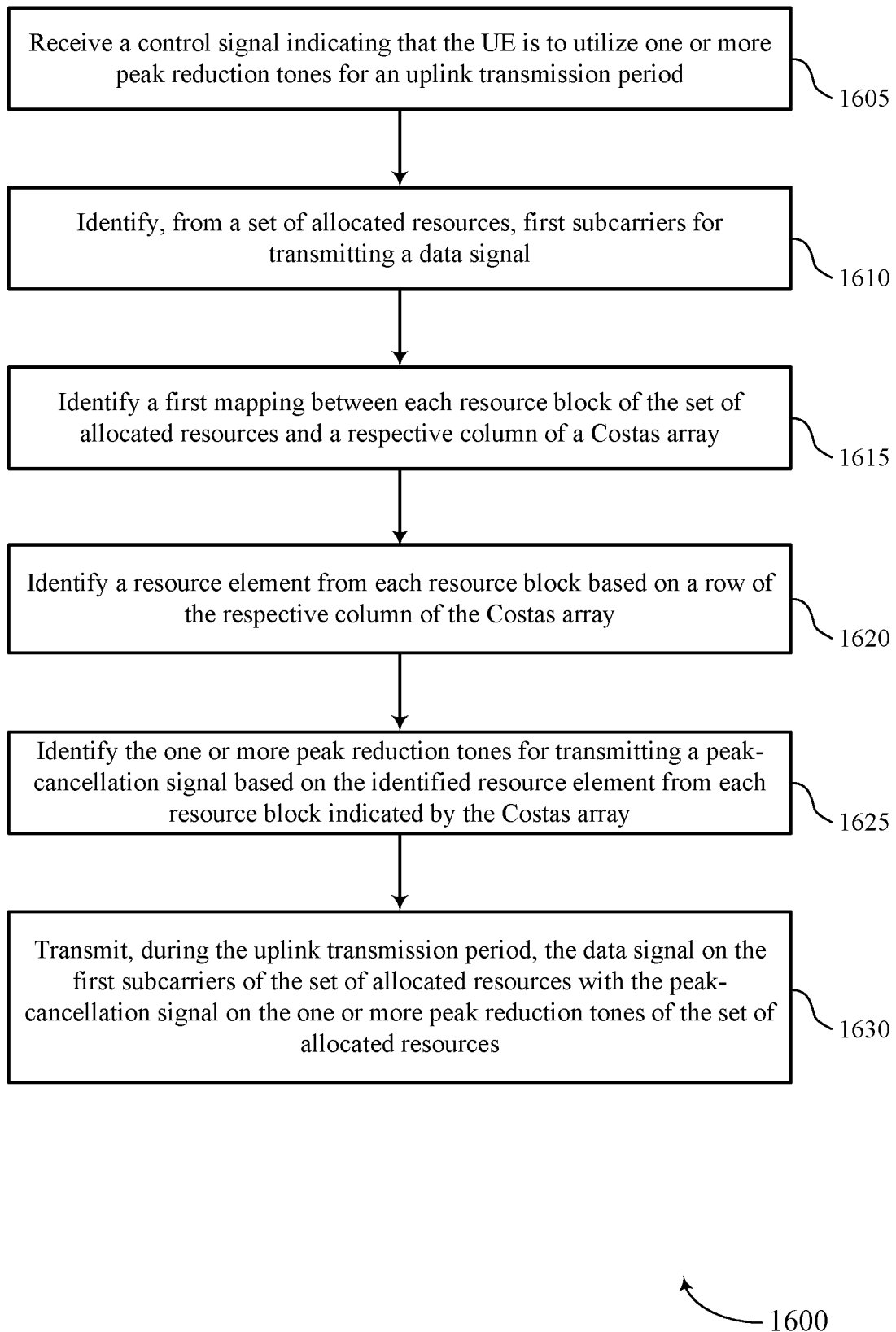

FIG. 16 shows a flowchart illustrating a method 1600 that supports PAPR reduction with pseudo-random in-band tone reservation in accordance with aspects of the present disclosure. The operations of method 1600 may be implemented by a UE 115 or its components as described herein. For example, the operations of method 1600 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1605, the UE may receive a control signal indicating that the UE is to utilize one or more PRTs for an uplink transmission period. The operations of 1605 may be performed according to the methods described herein. In some examples, aspects of the operations of 1605 may be performed by a PRT manager as described with reference to FIGS. 7 through 10.

At 1610, the UE may identify, from a set of allocated resources, first subcarriers for transmitting a data signal. The operations of 1610 may be performed according to the methods described herein. In some examples, aspects of the operations of 1610 may be performed by a data tone manager as described with reference to FIGS. 7 through 10.

At 1615, the UE may identify a first mapping between each RB of the set of allocated resources and a respective column of a Costas array. The operations of 1615 may be performed according to the methods described herein. In some examples, aspects of the operations of 1615 may be performed by a RB mapping manager as described with reference to FIGS. 7 through 10.

At 1620, the UE may identify a RE from each RB based on a row of the respective column of the Costas array. The operations of 1620 may be performed according to the methods described herein. In some examples, aspects of the operations of 1620 may be performed by a PRT manager as described with reference to FIGS. 7 through 10.

At 1625, the UE may identify the one or more PRTs for transmitting a peak-cancellation signal based on the identified RE from each RB indicated by the Costas array.

The operations of 1625 may be performed according to the methods described herein. In some examples, aspects of the operations of 1625 may be performed by a PRT manager as described with reference to FIGS. 7 through 10.

At 1630, the UE may transmit, during the uplink transmission period, the data signal on the first subcarriers of the set of allocated resources with the peak-cancellation signal on the one or more PRTs of the set of allocated resources. The operations of 1630 may be performed according to the methods described herein. In some examples, aspects of the operations of 1630 may be performed by an uplink transmission manager as described with reference to FIGS. 7 through 10.

Figure 17:
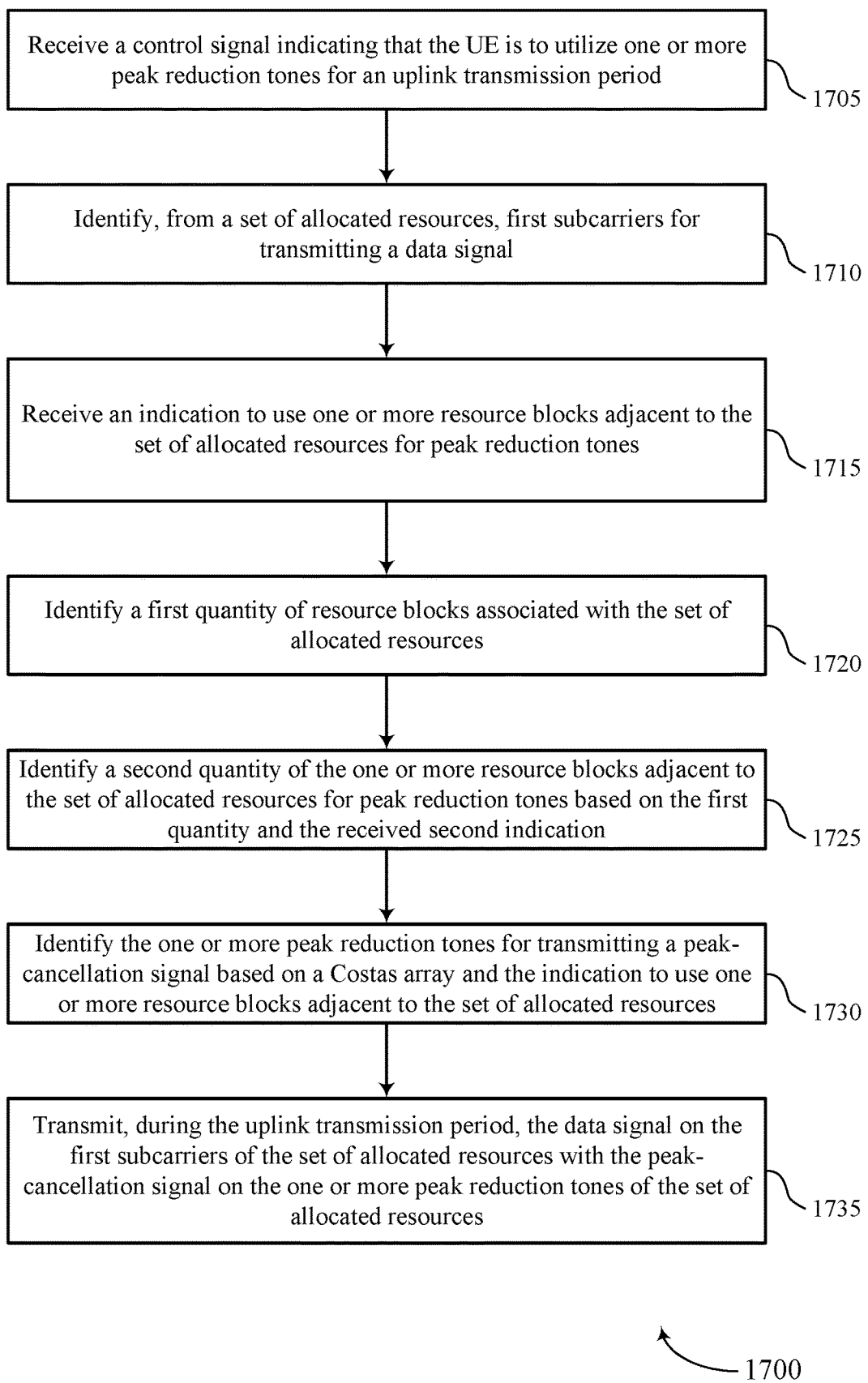

FIG. 17 shows a flowchart illustrating a method 1700 that supports PAPR reduction with pseudo-random in-band tone reservation in accordance with aspects of the present disclosure. The operations of method 1700 may be implemented by a UE 115 or its components as described herein. For example, the operations of method 1700 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1705, the UE may receive a control signal indicating that the UE is to utilize one or more PRTs for an uplink transmission period. The operations of 1705 may be performed according to the methods described herein. In some examples, aspects of the operations of 1705 may be performed by a PRT manager as described with reference to FIGS. 7 through 10.

At 1710, the UE may identify, from a set of allocated resources, first subcarriers for transmitting a data signal. The operations of 1710 may be performed according to the methods described herein. In some examples, aspects of the operations of 1710 may be performed by a data tone manager as described with reference to FIGS. 7 through 10.

At 1715, the UE may receive an indication to use one or more RBs adjacent to the set of allocated resources for PRTs. The operations of 1715 may be performed according to the methods described herein. In some examples, aspects of the operations of 1715 may be performed by a PRT manager as described with reference to FIGS. 7 through 10.

At 1720, the UE may identify a first quantity of RBs associated with the set of allocated resources. The operations of 1720 may be performed according to the methods described herein. In some examples, aspects of the operations of 1720 may be performed by a RB mapping manager as described with reference to FIGS. 7 through 10.

At 1725, the UE may identify a second quantity of the one or more RBs adjacent to the set of allocated resources for PRTs based on the first quantity and the received second indication. The operations of 1725 may be performed according to the methods described herein. In some examples, aspects of the operations of 1725 may be performed by a RB mapping manager as described with reference to FIGS. 7 through 10.

At 1730, the UE may identify the one or more PRTs for transmitting a peak-cancellation signal based on a Costas array and the one or more RBs adjacent to the set of allocated resources (e.g., as described in more detail herein, for example, with reference to FIG. 5). The operations of 1730 may be performed according to the methods described herein. In some examples, aspects of the operations of 1730 may be performed by a PRT manager as described with reference to FIGS. 7 through 10.

At 1735, the UE may transmit, during the uplink transmission period, the data signal on the first subcarriers of the set of allocated resources with the peak-cancellation signal on the one or more PRTs of the set of allocated resources. The operations of 1735 may be performed according to the methods described herein. In some examples, aspects of the operations of 1735 may be performed by an uplink transmission manager as described with reference to FIGS. 7 through 10.

Figure 18:
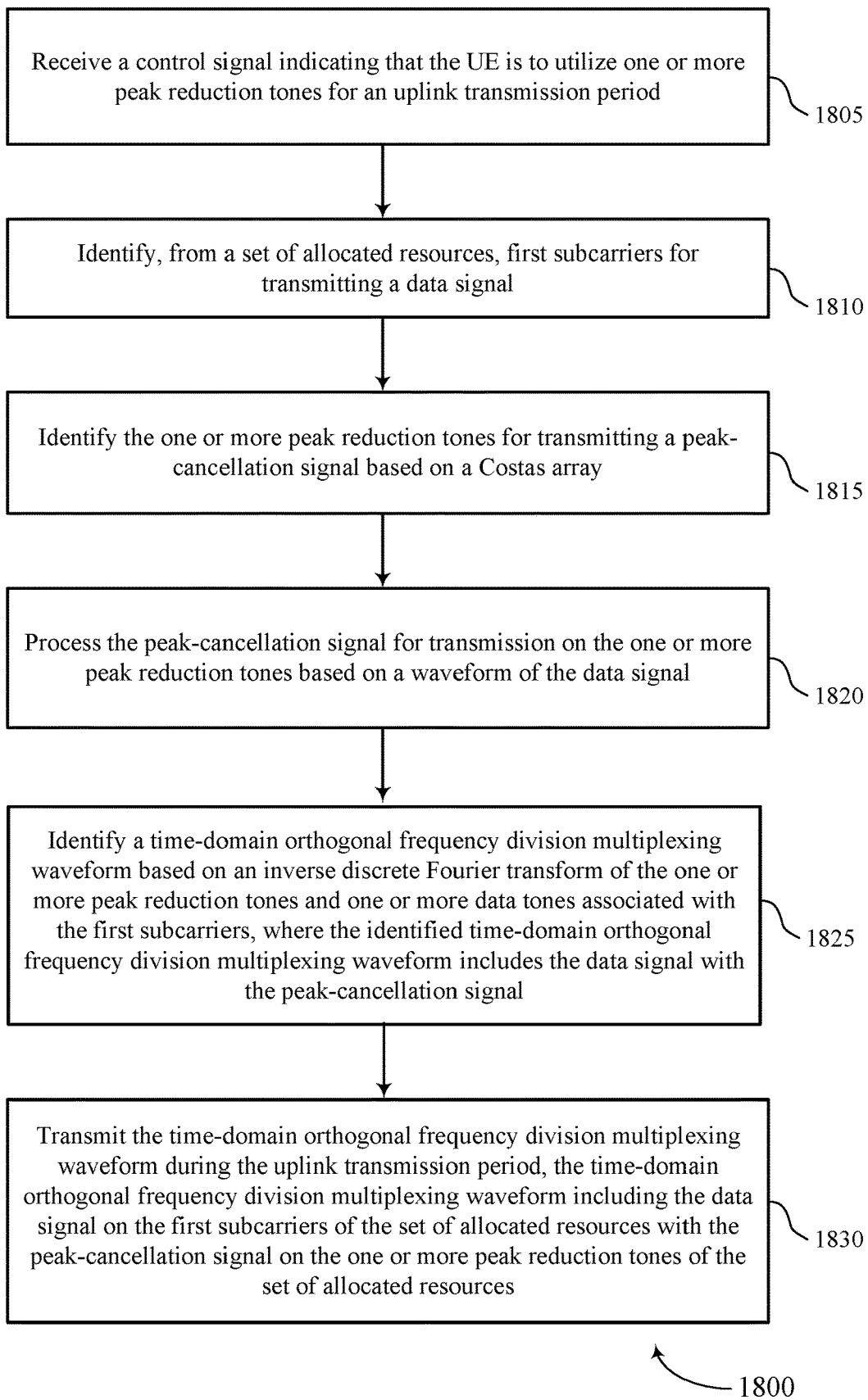

FIG. 18 shows a flowchart illustrating a method 1800 that supports PAPR reduction with pseudo-random in-band tone reservation in accordance with aspects of the present disclosure. The operations of method 1800 may be implemented by a UE 115 or its components as described herein. For example, the operations of method 1800 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1805, the UE may receive a control signal indicating that the UE is to utilize one or more PRTs for an uplink transmission period. The operations of 1805 may be performed according to the methods described herein. In some examples, aspects of the operations of 1805 may be performed by a PRT manager as described with reference to FIGS. 7 through 10.

At 1810, the UE may identify, from a set of allocated resources, first subcarriers for transmitting a data signal. The operations of 1810 may be performed according to the methods described herein. In some examples, aspects of the operations of 1810 may be performed by a data tone manager as described with reference to FIGS. 7 through 10.

At 1815, the UE may identify the one or more PRTs for transmitting a peak-cancellation signal based on a Costas array. The operations of 1815 may be performed according to the methods described herein. In some examples, aspects of the operations of 1815 may be performed by a PRT manager as described with reference to FIGS. 7 through 10.

At 1820, the UE may process the peak-cancellation signal for transmission on the one or more PRTs based on a waveform of the data signal. The operations of 1820 may be performed according to the methods described herein. In some examples, aspects of the operations of 1820 may be performed by a PAPR manager as described with reference to FIGS. 7 through 10.

At 1825, the UE may identify a time-domain OFDM waveform based on an inverse discrete Fourier transform of the one or more PRTs and one or more data tones associated with the first subcarriers, where the identified time-domain OFDM waveform includes the data signal with the processed peak-cancellation signal. The operations of 1825 may be performed according to the methods described herein. In some examples, aspects of the operations of 1825 may be performed by an uplink transmission manager as described with reference to FIGS. 7 through 10.

At 1830, the UE may transmit the time-domain OFDM waveform during the uplink transmission period (e.g., where time-domain OFDM waveform includes the data signal on the first subcarriers of the set of allocated resources with the peak-cancellation signal on the one or more PRTs of the set of allocated resources). The operations of 1830 may be performed according to the methods described herein. In some examples, aspects of the operations of 1830 may be performed by an uplink transmission manager as described with reference to FIGS. 7 through 10.

Figure 19:
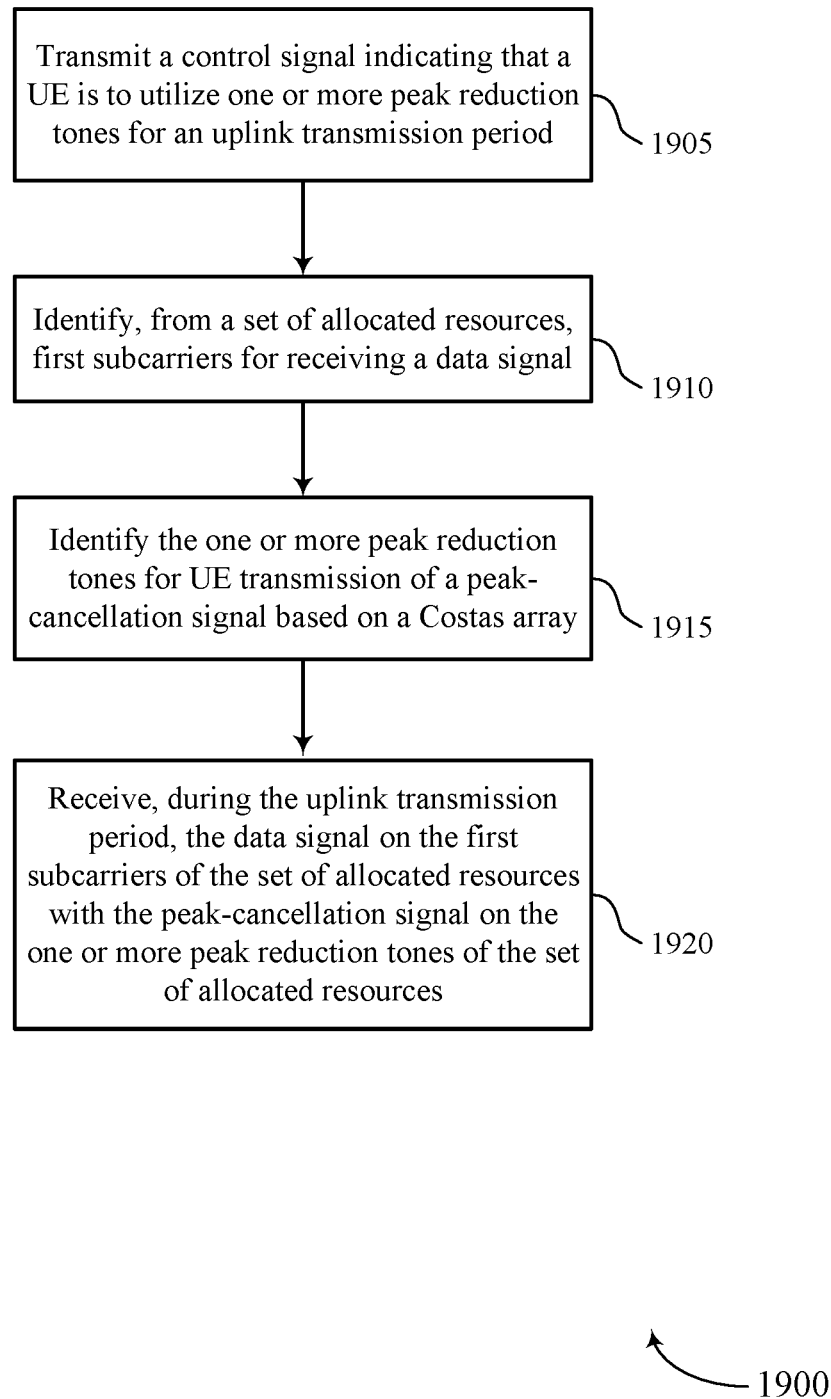

FIG. 19 shows a flowchart illustrating a method 1900 that supports PAPR reduction with pseudo-random in-band tone reservation in accordance with aspects of the present disclosure. The operations of method 1900 may be implemented by a base station 105 or its components as described herein. For example, the operations of method 1900 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1905, the base station may transmit a control signal indicating that a UE is to utilize one or more PRTs for an uplink transmission period. The operations of 1905 may be performed according to the methods described herein. In some examples, aspects of the operations of 1905 may be performed by a PRT manager as described with reference to FIGS. 11 through 14.

At 1910, the base station may identify, from a set of allocated resources, first subcarriers for receiving a data signal. The operations of 1910 may be performed according to the methods described herein. In some examples, aspects of the operations of 1910 may be performed by a data tone manager as described with reference to FIGS. 11 through 14.

At 1915, the base station may identify the one or more PRTs for UE transmission of a peak-cancellation signal based on a Costas array. The operations of 1915 may be performed according to the methods described herein. In some examples, aspects of the operations of 1915 may be performed by a PRT manager as described with reference to FIGS. 11 through 14.

At 1920, the base station may receive, during the uplink transmission period, the data signal on the first subcarriers of the set of allocated resources with the peak-cancellation signal on the one or more PRTs of the set of allocated resources. The operations of 1920 may be performed according to the methods described herein. In some examples, aspects of the operations of 1920 may be performed by an uplink transmission manager as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication, comprising: receiving a control signal indicating that the UE is to utilize one or more PRTs for an uplink transmission period, identifying, from a set of allocated resources, first subcarriers for transmitting a data signal, identifying the one or more PRTs for transmitting a peak-cancellation signal based on a Costas array, and transmitting, during the uplink transmission period, the data signal on the first subcarriers of the set of allocated resources with the peak-cancellation signal on the one or more PRTs of the set of allocated resources.

Aspect 2: The method of aspect 1, where identifying the one or more PRTs for the peak-cancellation signal based on the Costas array includes identifying a first mapping between each RB of the set of allocated resources and a respective column of the Costas array and identifying a RE from each RB based on a row of the respective column of the Costas array, wherein the one or more PRTs for the peak-cancellation signal are identified based on the identified RE from each RB.

Aspect 3: The method of aspect 2, further comprising: receiving a first indication of a first starting column of the Costas array, wherein the first mapping is identified based on the first starting column of the Costas array.

Aspect 4: The method of any of aspects 2 or 3, further comprising: receiving a second indication of a second starting column of the Costas array and identifying a second mapping between a subset of RBs of the set of allocated resources and the respective column of the Costas array, wherein the second mapping is identified based on the second starting column of the Costas array.

Aspect 5: The method of any of aspects 2-4, further comprising: identifying a plurality of subsets of RBs of the set of allocated resources, wherein each subset of the plurality includes a quantity of RBs equivalent to a number of columns of the Costas array and identifying a different starting column of the Costas array for each of the plurality of subsets, wherein the first mapping between each RB of the set of allocated resources and the respective column of the Costas array is based on the different starting column of the Costas array.

Aspect 6: The method of any of aspects 2-5, further comprising: identifying a decimation factor for the first mapping between each RB of the set of allocated resources and a respective column of the Costas array, wherein the first mapping is identified based on the decimation factor.

Aspect 7: The method of aspect 6, further comprising: receiving an indication of the decimation factor, wherein the decimation factor is identified based on the indication.

Aspect 8: The method of aspect 6 or 7, where the decimation factor indicates a pattern of a first set of RBs used entirely for data and a second set of RBs each respectively including at least one RE for PRTs.

Aspect 9: The method of any of aspects 1-8, further comprising: receiving an indication to use one or more RBs adjacent to the set of allocated resources for PRTs, wherein the one or more PRTs are identified based on the one or more RBs adjacent to the set of allocated resources.

Aspect 10: The method of aspect 9, further comprising: identifying a transmission power level based on the received second indication to use one or more RBs adjacent to the set of allocated resources for PRTs.

Aspect 11: The method of aspect 9 or 10, further comprising: identifying a first quantity of RBs associated with the set of allocated resources and identifying a second quantity of the one or more RBs adjacent to the set of allocated resources for PRTs based on the first quantity and the received second indication.

Aspect 12: The method of any of aspects 1-11, where identifying the one or more PRTs for the peak-cancellation signal based on the Costas array includes identifying one RE in every RB of the set of allocated resources, wherein the one RE is allocated as a PRT.

Aspect 13: The method of any of aspects 1-12, where the Costas array is based on a primitive element equal to two and a prime number equal to thirteen.

Aspect 14: The method of any of aspects 1-13, where the Costas array includes a twelve by twelve Costas array.

Aspect 15: The method of any of aspects 1-14, where the Costas array includes a first column indicating a first PRT in a second RE of a first RB corresponding to the first column, a second column indicating a second PRT in a fourth RE of a second RB corresponding to the second column, a third column indicating a third PRT in a eighth RE of a third RB corresponding to the third column, a fourth column indicating a fourth PRT in a third RE of a fourth RB corresponding to the fourth column, a fifth column indicating a fifth PRT in a sixth RE of a fifth RB corresponding to the fifth column, a sixth column indicating a sixth PRT in a twelfth RE of a sixth RB corresponding to the sixth column, a seventh column indicating a seventh PRT in a eleventh RE of a seventh RB corresponding to the seventh column, an eighth column indicating an eighth PRT in a ninth RE of an eighth RB corresponding to the eighth column, a ninth column indicating a ninth PRT in a fifth RE of a ninth RB corresponding to the ninth column, a tenth column indicating a tenth PRT in a tenth RE of a tenth RB corresponding to the tenth column, an eleventh column indicating an eleventh PRT in a seventh RE of an eleventh RB corresponding to the eleventh column, and a twelfth column indicating a twelfth PRT in a first RE of a twelfth RB corresponding to the twelfth column.

Aspect 16: The method of any of aspects 1-15, where each column of the Costas array indicates, for a respective RB of the set of allocated resources, a RE for a PRT and each column of the Costas array indicates a different position for the RE within the respective RB.

Aspect 17: The method of any of aspects 1-16, further comprising: identifying the Costas array based on identifying a number of RBs associated with the set of allocated resources exceeds a threshold, wherein the Costas array includes a thirty six by thirty six Costas array.

Aspect 18: The method of aspect 17, where the Costas array is based on a primitive element equal to two and a prime number equal to thirty-seven.

Aspect 19: The method of any of aspects 1-18, further comprising: processing the peak-cancellation signal for transmission on the one or more PRTs based on a waveform of the data signal.

Aspect 20: The method of aspect 19, where the peak-cancellation signal reduces a peak-to-average-power ratio associated with the data signal based on the processing.

Aspect 21: The method of aspect 19 or 20, where the peak-cancellation signal satisfies a power budget threshold associated with the uplink transmission period based on the processing.

Aspect 22: The method of any of aspects 1-21, where transmitting the data signal with the peak-cancellation signal includes: identifying a time-domain orthogonal frequency division multiplexing waveform based on an inverse discrete Fourier transform of the one or more PRTs and one or more data tones associated with the first subcarriers, wherein the identified time-domain orthogonal frequency division multiplexing waveform includes the data signal with the peak-cancellation signal.

Aspect 23: A method for wireless communication, comprising: transmitting a control signal indicating that a user equipment (UE) is to utilize one or more PRTs for an uplink transmission period, identifying, from a set of allocated resources, first subcarriers for receiving a data signal, identifying the one or more PRTs for transmitting a peak-cancellation signal based on a Costas array, and receiving, during the uplink transmission period, the data signal on the first subcarriers of the set of allocated resources with the peak-cancellation signal on the one or more PRTs of the set of allocated resources.

Aspect 24: The method of aspect 23, where identifying the one or more PRTs for the peak-cancellation signal based on the Costas array includes: identifying a first mapping between each RB of the set of allocated resources and a respective column of the Costas array and identifying a RE from each RB based on a row of the respective column of the Costas array, wherein the one or more PRTs for the peak-cancellation signal are identified based on the identified RE from each RB.

Aspect 25: The method of aspect 24, further comprising: transmitting a first indication of a first starting column of the Costas array, wherein the first mapping is based on the first starting column of the Costas array.

Aspect 26: The method of aspect 24 or 25, further comprising: identifying a second mapping between a subset of RBs of the set of allocated resources and the respective column of the Costas array and transmitting a second indication of a second starting column of the Costas array, wherein the second mapping is based on the second starting column of the Costas array.

Aspect 27: The method of any of aspects 24-26, further comprising: identifying a plurality of subsets of RBs of the set of allocated resources, wherein each subset of the plurality includes a quantity of RBs equivalent to a number of columns of the Costas array and identifying a different starting column of the Costas array for each of the plurality of subsets, wherein the first mapping between each RB of the set of allocated resources and the respective column of the Costas array is based on the different starting column of the Costas array.

Aspect 28: The method of any of aspects 24-27, further comprising: identifying a decimation factor for the first mapping between each RB of the set of allocated resources and a respective column of the Costas array, wherein the first mapping is identified based on the decimation factor.

Aspect 29: The method of aspect 28, further comprising: transmitting an indication of the decimation factor, wherein the decimation factor is based on the indication.

Aspect 30: The method of aspect 28 or 29, wherein the decimation factor indicates a pattern of a first set of RBs used entirely for data and a second set of RBs each respectively including at least one RE for PRTs.

Aspect 31: The method of any of aspects 23-30, further comprising: transmitting an indication to use one or more RBs adjacent to the set of allocated resources for PRTs, wherein the one or more PRTs are identified based on the one or more RBs adjacent to the set of allocated resources.

Aspect 32: The method of aspects 31, further comprising: identifying a transmission power level based on the received second indication to use one or more RBs adjacent to the set of allocated resources for PRTs, wherein the data signal and peak cancellation signal are received based on the identified transmission power level.

Aspect 33: The method of any of aspects 31 or 32, further comprising: identifying a first quantity of RBs associated with the set of allocated resources and identifying a second quantity of the one or more RBs adjacent to the set of allocated resources for PRTs based on the first quantity and the received second indication.

Aspect 34: The method of any of aspects 23-33, wherein identifying the one or more PRTs for the peak-cancellation signal based on the Costas array includes: identifying one RE in every RB of the set of allocated resources, wherein the one RE is allocated as a PR.

Aspect 35: The method of any of aspects 23-34, wherein the Costas array is based on a primitive element equal to two and a prime number equal to thirteen.

Aspect 36: The method of any of aspects 23-35, wherein the Costas array includes a twelve by twelve Costas array.

Aspect 37: The method of any of aspects 23-36, where the Costas array includes a first column indicating a first PRT in a second RE of a first RB corresponding to the first column, a second column indicating a second PRT in a fourth RE of a second RB corresponding to the second column, a third column indicating a third PRT in a eighth RE of a third RB corresponding to the third column, a fourth column indicating a fourth PRT in a third RE of a fourth RB corresponding to the fourth column, a fifth column indicating a fifth PRT in a sixth RE of a fifth RB corresponding to the fifth column, a sixth column indicating a sixth PRT in a twelfth RE of a sixth RB corresponding to the sixth column, a seventh column indicating a seventh PRT in a eleventh RE of a seventh RB corresponding to the seventh column, an eighth column indicating an eighth PRT in a ninth RE of an eighth RB corresponding to the eighth column, a ninth column indicating a ninth PRT in a fifth RE of a ninth RB corresponding to the ninth column, a tenth column indicating a tenth PRT in a tenth RE of a tenth RB corresponding to the tenth column, an eleventh column indicating an eleventh PRT in a seventh RE of an eleventh RB corresponding to the eleventh column, and a twelfth column indicating a twelfth PRT in a first RE of a twelfth RB corresponding to the twelfth column Aspect 38: The method of any of aspects 23-37, wherein each column of the Costas array indicates, for a respective RB of the set of allocated resources, a RE for a PRT and each column of the Costas array indicates a different position for the RE within the respective RB.

Aspect 39: The method of any of aspects 23-28, further comprising: identifying the Costas array based on identifying a number of RBs associated with the set of allocated resources exceeds a threshold, wherein the Costas array includes a thirty six by thirty six Costas array.

Aspect 40: The method of aspect 39, wherein the Costas array is based on a primitive element equal to two and a prime number equal to thirty-seven.

Aspect 41: The method of any of aspects 23-40, further comprising: identifying a waveform of the data signal based on processing the peak-cancellation signal on the one or more PRTs.

Aspect 42: The method of aspect 41, wherein the peak-cancellation signal reduces a peak-to-average-power ratio associated with the identified waveform Aspect 43: The method of any of aspects 41 or 42, wherein the identified waveform satisfies a power budget threshold associated with the uplink transmission period Aspect 44: The method of any of aspects 23-43, further comprising: identifying a time-domain orthogonal frequency division multiplexing waveform based on the receiving and identifying the one or more PRTs and one or more data tones associated with the first subcarriers based on a fast Fourier transform of the time-domain orthogonal frequency division multiplexing waveform.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving a control signal indicating that the UE is to utilize one or more peak reduction tones for an uplink transmission period;
   identifying, from a set of allocated resources, first subcarriers for transmitting a data signal;
   identifying the one or more peak reduction tones of a peak-cancellation signal based at least in part on a Costas array, wherein the one or more peak reduction tones are identified within one or more resource blocks of the set of allocated resources based at least in part on non-zero values within one or more columns of the Costas array corresponding to the one or more resource blocks;
   generating an uplink waveform based at least in part on the data signal and the peak-cancellation signal; and
   transmitting the uplink waveform during the uplink transmission period.

2. The method of claim 1, wherein identifying the one or more peak reduction tones for the peak-cancellation signal based at least in part on the Costas array comprises:
identifying a first mapping between each resource block of the set of allocated resources and a respective column of the Costas array; and
identifying a resource element from each resource block based at least in part on a row of the respective column of the Costas array, wherein the one or more peak reduction tones of the peak-cancellation signal are identified based at least in part on the identified resource element from each resource block.

3. The method of claim 2, further comprising:
receiving a first indication of a first starting column of the Costas array, wherein the first mapping is identified based at least in part on the first starting column of the Costas array.

4. The method of claim 2, further comprising:
receiving a second indication of a second starting column of the Costas array; and
identifying a second mapping between a subset of resource blocks of the set of allocated resources and the respective column of the Costas array, wherein the second mapping is identified based at least in part on the second starting column of the Costas array.

5. The method of claim 2, further comprising:
identifying a plurality of subsets of resource blocks of the set of allocated resources, wherein each subset of the plurality of subsets includes a quantity of resource blocks equivalent to a number of columns of the Costas array; and
identifying a different starting column of the Costas array for each of the plurality of subsets, wherein the first mapping between each resource block of the set of allocated resources and the respective column of the Costas array is based at least in part on the different starting column of the Costas array.

6. The method of claim 2, further comprising:
identifying a decimation factor for the first mapping between each resource block of the set of allocated resources and a respective column of the Costas array, wherein the first mapping is identified based at least in part on the decimation factor.

7. The method of claim 6, further comprising:
receiving an indication of the decimation factor, wherein the decimation factor is identified based at least in part on the indication.

8. The method of claim 6, wherein the decimation factor indicates a pattern of a first set of resource blocks used entirely for data and a second set of resource blocks each respectively including at least one resource element for peak reduction tones.

9. The method of claim 1, wherein identifying the one or more peak reduction tones for the peak-cancellation signal based at least in part on the Costas array comprises:
identifying one resource element in every resource block of the set of allocated resources, wherein the one resource element in every resource block is allocated as a peak reduction tone.

10. The method of claim 1, wherein the Costas array is based at least in part on a primitive element equal to two and a prime number equal to thirteen.

11. The method of claim 1, wherein the Costas array comprises a twelve by twelve Costas array.

12. The method of claim 11, wherein the Costas array comprises a first column indicating a first peak reduction tone in a second resource element of a first resource block corresponding to the first column, a second column indicating a second peak reduction tone in a fourth resource element of a second resource block corresponding to the second column, a third column indicating a third peak reduction tone in a eighth resource element of a third resource block corresponding to the third column, a fourth column indicating a fourth peak reduction tone in a third resource element of a fourth resource block corresponding to the fourth column, a fifth column indicating a fifth peak reduction tone in a sixth resource element of a fifth resource block corresponding to the fifth column, a sixth column indicating a sixth peak reduction tone in a twelfth resource element of a sixth resource block corresponding to the sixth column, a seventh column indicating a seventh peak reduction tone in a eleventh resource element of a seventh resource block corresponding to the seventh column, an eighth column indicating an eighth peak reduction tone in a ninth resource element of an eighth resource block corresponding to the eighth column, a ninth column indicating a ninth peak reduction tone in a fifth resource element of a ninth resource block corresponding to the ninth column, a tenth column indicating a tenth peak reduction tone in a tenth resource element of a tenth resource block corresponding to the tenth column, an eleventh column indicating an eleventh peak reduction tone in a seventh resource element of an eleventh resource block corresponding to the eleventh column, and a twelfth column indicating a twelfth peak reduction tone in a first resource element of a twelfth resource block corresponding to the twelfth column.

13. The method of claim 1, further comprising:
identifying the Costas array based at least in part on identifying a number of resource blocks associated with the set of allocated resources exceeds a threshold, wherein the Costas array comprises a thirty six by thirty six Costas array.

14. The method of claim 13, wherein the Costas array is based at least in part on a primitive element equal to two and a prime number equal to thirty-seven.

15. The method of claim 1, further comprising:
generating the uplink waveform based at least in part on the peak-cancellation signal and a waveform of the data signal.

16. The method of claim 15, wherein the peak-cancellation signal reduces a peak-to-average power ratio associated with the uplink waveform relative to the waveform of the data signal.

17. The method of claim 15, wherein the peak-cancellation signal satisfies a power budget threshold associated with the uplink transmission period.

18. The method of claim 1, wherein transmitting the uplink waveform comprises:
identifying a time-domain orthogonal frequency division multiplexing waveform based at least in part on an inverse discrete Fourier transform of the one or more peak reduction tones and one or more data tones associated with the first subcarriers, wherein the identified time-domain orthogonal frequency division multiplexing waveform comprises the data signal with the peak-cancellation signal.

19. A method for wireless communication at a base station, comprising:
transmitting a control signal indicating that a user equipment (UE) is to utilize one or more peak reduction tones for an uplink transmission period;
identifying, from a set of allocated resources, first subcarriers for receiving a data signal;

identifying the one or more peak reduction tones of a peak-cancellation signal based at least in part on a Costas array, wherein the one or more peak reduction tones are identified within one or more resource blocks of the set of allocated resources based at least in part on non-zero values within one or more columns of the Costas array corresponding to the one or more resource blocks; and receiving an uplink waveform during the uplink transmission period, wherein the uplink waveform is based at least in part on the data signal and the peak-cancellation signal.

20. The method of claim 19, wherein identifying the one or more peak reduction tones for the peak-cancellation signal based at least in part on the Costas array comprises:
identifying a first mapping between each resource block of the set of allocated resources and a respective column of the Costas array; and
identifying a resource element from each resource block based at least in part on a row of the respective column of the Costas array, wherein the one or more peak reduction tones of the peak-cancellation signal are identified based at least in part on the identified resource element from each resource block.

21. The method of claim 20, further comprising:
transmitting a first indication of a first starting column of the Costas array, wherein the first mapping is based at least in part on the first starting column of the Costas array.

22. The method of claim 20, further comprising:
identifying a second mapping between a subset of resource blocks of the set of allocated resources and the respective column of the Costas array; and
transmitting a second indication of a second starting column of the Costas array, wherein the second mapping is based at least in part on the second starting column of the Costas array.

23. The method of claim 20, further comprising:
identifying a plurality of subsets of resource blocks of the set of allocated resources, wherein each subset of the plurality of subsets includes a quantity of resource blocks equivalent to a number of columns of the Costas array; and
identifying a different starting column of the Costas array for each of the plurality of subsets, wherein the first mapping between each resource block of the set of allocated resources and the respective column of the Costas array is based at least in part on the different starting column of the Costas array.

24. The method of claim 20, further comprising:
identifying a decimation factor for the first mapping between each resource block of the set of allocated resources and a respective column of the Costas array, wherein the first mapping is identified based at least in part on the decimation factor.

25. An apparatus for wireless communication, comprising:
a processor,
memory coupled with the processor; and
instructions stored in the memory and executable by the processor to cause the apparatus to:
receive a control signal indicating that a user equipment (UE) associated with the apparatus is to utilize one or more peak reduction tones for an uplink transmission period;
identify, from a set of allocated resources, first subcarriers for transmitting a data signal;
identify the one or more peak reduction tones of a peak-cancellation signal based at least in part on a Costas array, wherein the one or more peak reduction tones are identified within one or more resource blocks of the set of allocated resources based at least in part on non-zero values within one or more columns of the Costas array corresponding to the one or more resource blocks;
generate an uplink waveform based at least in part on the data signal and the peak-cancellation signal; and
transmit the uplink waveform during the uplink transmission period.

26. The apparatus of claim 25, wherein the instructions to identify the one or more peak reduction tones for the peak-cancellation signal based at least in part on the Costas array are executable by the processor to cause the apparatus to:
identify a first mapping between each resource block of the set of allocated resources and a respective column of the Costas array; and
identify a resource element from each resource block based at least in part on a row of the respective column of the Costas array, wherein the one or more peak reduction tones of the peak-cancellation signal are identified based at least in part on the identified resource element from each resource block.

27. The apparatus of claim 26, wherein the instructions are further executable by the processor to cause the apparatus to:
receive a first indication of a first starting column of the Costas array, wherein the first mapping is identified based at least in part on the first starting column of the Costas array.

28. The apparatus of claim 26, wherein the instructions are further executable by the processor to cause the apparatus to:
receive a second indication of a second starting column of the Costas array; and
identify a second mapping between a subset of resource blocks of the set of allocated resources and the respective column of the Costas array, wherein the second mapping is identified based at least in part on the second starting column of the Costas array.

29. An apparatus for wireless communication, comprising:
a processor,
memory coupled with the processor; and
instructions stored in the memory and executable by the processor to cause the apparatus to:
transmit a control signal indicating that a user equipment (UE) is to utilize one or more peak reduction tones for an uplink transmission period;
identify, from a set of allocated resources, first subcarriers for receiving a data signal;
identify the one or more peak reduction tones of a peak-cancellation signal based at least in part on a Costas array, wherein the one or more peak reduction tones are identified within one or more resource blocks of the set of allocated resources based at least in part on non-zero values within one or more columns of the Costas array corresponding to the one or more resource blocks; and
receive an uplink waveform during the uplink transmission period, wherein the uplink waveform is based at least in part on the data signal and the peak-cancellation signal.

30. The apparatus of claim 29, wherein the instructions to identify the one or more peak reduction tones for the peak-cancellation signal based at least in part on the Costas array are executable by the processor to cause the apparatus to:
- identify a first mapping between each resource block of the set of allocated resources and a respective column of the Costas array; and
- identify a resource element from each resource block based at least in part on a row of the respective column of the Costas array, wherein the one or more peak reduction tones of the peak-cancellation signal are identified based at least in part on the identified resource element from each resource block.

* * * * *

UNITED STATES PATENT AND TRADEMARK OFFICE
CERTIFICATE OF CORRECTION

| | |
|---|---|
| PATENT NO. | : 11,677,603 B2 |
| APPLICATION NO. | : 17/241393 |
| DATED | : June 13, 2023 |
| INVENTOR(S) | : Sahraei et al. |

It is certified that error appears in the above-identified patent and that said Letters Patent is hereby corrected as shown below:

On the Title Page

Item (72), under Inventors:
Inventor 8:
Delete "Gokul Sridaran" and add "Gokul Sridharan"

Signed and Sealed this
Fifteenth Day of August, 2023

Katherine Kelly Vidal
*Director of the United States Patent and Trademark Office*